(12) United States Patent
Inoue

(10) Patent No.: US 7,508,241 B2
(45) Date of Patent: Mar. 24, 2009

(54) DATA TRANSFER METHOD, DATA TRANSFER CIRCUIT, OUTPUT CIRCUIT, INPUT CIRCUIT, SEMICONDUCTOR DEVICE, AND ELECTRONIC APPARATUS

(75) Inventor: Toshiaki Inoue, Tokyo (JP)

(73) Assignee: Pioneer Corporation, Tokyo (JP)

( * ) Notice: Subject to any disclaimer, the term of this patent is extended or adjusted under 35 U.S.C. 154(b) by 186 days.

(21) Appl. No.: 10/563,748

(22) PCT Filed: Jul. 8, 2004

(86) PCT No.: PCT/JP2004/009718

§ 371 (c)(1),
(2), (4) Date: Oct. 2, 2006

(87) PCT Pub. No.: WO2005/006552

PCT Pub. Date: Jan. 20, 2005

(65) Prior Publication Data

US 2007/0176911 A1    Aug. 2, 2007

(30) Foreign Application Priority Data

Jul. 11, 2003    (JP) .............................. 2003-273258

(51) Int. Cl.
*H02M 11/00*    (2006.01)
(52) U.S. Cl. .......................... 327/103; 345/204; 326/86
(58) Field of Classification Search ............. 341/56–57, 341/61; 327/100, 103; 345/204; 326/86, 326/30
See application file for complete search history.

(56) References Cited

U.S. PATENT DOCUMENTS

| | | | | |
|---|---|---|---|---|
| 6,456,210 B2 * | 9/2002 | Aunio et al. | ................. | 341/110 |
| 6,476,736 B2 * | 11/2002 | Bartlett | ......................... | 341/56 |
| 6,567,023 B1 * | 5/2003 | Iwata | ......................... | 341/126 |
| 6,727,831 B2 | 4/2004 | Iwata | | |
| 7,259,740 B2 * | 8/2007 | Haga et al. | .................... | 345/98 |

FOREIGN PATENT DOCUMENTS

| | | |
|---|---|---|
| JP | 03-216023 | 9/1991 |
| JP | 05-063574 | 3/1993 |
| JP | 10-243031 | 9/1998 |
| JP | 2001-156621 | 6/2001 |

* cited by examiner

*Primary Examiner*—Dinh T. Le
(74) *Attorney, Agent, or Firm*—Drinker Biddle & Reath LLP

(57) ABSTRACT

A data transfer circuit comprises a voltage/current converter circuit for converting a first binary voltage data of n bits (n is an integer equal to or larger than two) to multi-value current data of $2^n$ values which is output to a single data transfer line. A current comparator circuit converts the multi-value current data on the data transfer line to binary current data of $(2^n-1)$ bits, and a current/voltage converter circuit converts the binary current data of the $(2^n-1)$ bits to second binary voltage data of $(2^n-1)$ bits. A counter circuit restores the first binary voltage data of the n bits from the second binary voltage data of the $(2^n-1)$ bits.

19 Claims, 16 Drawing Sheets

DATA TRANSFER METHOD, DATA TRANSFER CIRCUIT, OUTPUT CIRCUIT, INPUT CIRCUIT, SEMICONDUCTOR DEVICE, AND ELECTRONIC APPARATUS

TECHNICAL FIELD

The present invention relates to a data transfer method, a data transfer circuit, an output circuit, an input circuit, and an output circuit, and/or a semiconductor device and an electronic apparatus which use the input circuit.

BACKGROUND ART

With the trend toward higher functions of digital image processing apparatuses, and a higher image quality including a higher resolution, a need has been increased for transferring a large amount of data at high speeds among digital circuits, for example, among LSI'S mounted in a digital image processing apparatus.

FIG. 1 is a block diagram illustrating the configuration of a digital image processing apparatus of a first conventional example including a plasma panel display. Referring to FIG. 1, the digital image processing apparatus comprises an image processing LSI 501, bus lines 502, a driver 503, and a plasma display panel 504. The image processing LSI 501 performs signal processing such as color space conversion, γ-correction and the like, and the resulting image data is transferred to the driver 503 through the bus lines 502 for display on the plasma display panel 504.

Assume herein that each of the upper and lower halves of a plasma display panel having a resolution WXGA (abbreviation of Wide-XGA, meaning the number of pixels of 4095 pixels×768 lines) is driven by a 256-bit, 4-port driver. In this event, an image processing LSI requires a number of output terminals corresponding to 128 (4095 pixels/256 pixels×4 ports×2 areas) bus lines. In other words, in a conventional data transfer method using bus lines for handing binary voltage data, a large number of lines and input/output terminals of LSI's are required, so that a higher cost is anticipated for high-resolution apparatuses which will make their appearance in the future.

The challenge associated with binary voltage data based data transfer which requires a large number of lines and input/output terminals of LSI's can be solved by using a multi-value voltage data rather than the binary voltage data. For example, if 2-bit, 3-bit, or 4-bit binary voltage data is encoded to four-value, eight-value, or 16-value multi-value voltage data and transmitted from the transmission side, and the multi-value voltage data can be restored to the original 2-bit, 3-bit, and 4-bit binary voltage data on the reception side, the foregoing challenge can be solved. In this event, the number of lines can be reduced to ½, ⅓, or ¼ as many as that for a binary voltage data transfer.

However, for performing higher-order voltage multi-value encoding, a voltage per step of each value is reduced due to limitations in supply voltage, causing a relative increase in noise voltage. This makes it difficult to discriminate multiple values on the reception side. For example, when 4-bit binary voltage data is converted to 16-value voltage data which is transferred through a single line, a supply voltage of 3.3 V provides approximately 200 mV of voltage per step. Thus, for a normal data transfer, a noise voltage must be suppressed to one step or less, and the reception side must have a resolution of approximately 200 mV. Generally, high-order multiple value encoding of voltage data is difficult from viewpoints of noise margin and resolution.

For solving the challenge of a data transfer through the multi-value voltage data, there has been provided a data transfer method using multi-value current data. Multi-value current data encoding is suitable for higher value encoding because of a wide noise margin, as compared with multi-value voltage data encoding. For example, Japanese Patent Kokai No. 2001-156621 proposes a data transmission system (second conventional example). FIG. 2 shows this data transmission system. Referring to FIG. 2, binary voltage data output from an internal circuit 601 on the transmission side is converted to multi-value voltage data by a DA converter (DAC: Digital to Analog Converter) 602. The multi-value voltage data is converted to multi-value current data by a PMOS transistor 603. The multi-value current data is transmitted through a single data line 604. On the reception side, the multi-value current data is received by a current mirror circuit 605, and restored to the original binary voltage data by an AD converter (ADC: Analog to Digital Converter) 606. The restored binary voltage data is used in an internal circuit 607. This method can accomplish a data transfer which is less susceptible to the influence of noise between transmission and reception than a multi-value voltage data based data transfer, with a reduced number of bus lines.

However, when the second conventional example is applied to a digital image processing apparatus, following problems arise. After binary voltage data is converted to a multi-value voltage data by the DA converter 602, the multi-value voltage data is converted to multi-value current data by the PMOS transistor 603. Therefore, the voltage data is still susceptible to the influence of noise on the transmission side.

Also, when high-order multi-value encoding is performed on the transmission side, the DA converter 602 requires a large amount of hardware. In addition, since a sequential comparison type AD converter 606 is employed, the value is established from the most significant bit in order in the conversion from multi-value current data to binary-value voltage data. Thus, a long time is required on the reception side in order to restore original binary voltage data from multi-value current data.

What is desired is a data transfer method and circuit which are less susceptible to the influence of noise on the transmission side, require a small amount of hardware for conversion from binary voltage data to multi-value current data, and restore original binary voltage data from the multi-value current data at high speeds on the reception side.

Patent Document: Japanese Patent Kokai No. 2001-156621

DISCLOSURE OF THE INVENTION

It is an object of the present invention to provide a data transfer method and circuit which are less susceptible to the influence of noise on the transmission side.

It is another object of the present invention to provide a data transfer method and circuit which require small amount of hardware for a conversion from binary voltage data to multi-value current data.

It is a further object of the present invention to provide a data transfer method and circuit which restore original binary voltage data from multi-value current data at high speeds on the reception side.

In one aspect of the present invention, a data transfer method for a digital image processing apparatus is achieved by converting first binary voltage data of n-bit (n is an integer equal to or larger than two) to multi-value current data of $2^n$ values, transferring the multi-value current data through a single data line, converting the multi-value current data on the data line to binary current data of ($2^n-1$) bits, converting the binary current data of the ($2^n-1$) bits to second binary voltage data of ($2^n-1$) bits, and restoring the first binary voltage data of the n bits from the second binary voltage data of the ($2^n-1$) bits.

In another aspect of the present invention, a data transfer circuit for a digital image processing apparatus comprises a voltage/current converter circuit for converting first binary voltage data of n-bit (n is an integer equal to or larger than two) to multi-value current data of $2^n$ values, a single data transfer line for transferring the multi-value current, a current comparator circuit for converting the multi-value current data on the data line to binary current data of ($2^n-1$) bits, a current/voltage converter circuit for converting the binary current data of the ($2^n-1$) bits to second binary voltage data of ($2^n-1$) bits, and a counter circuit for restoring the first binary voltage data of the n bits from the second binary voltage data of the ($2^n-1$) bits.

Here, the voltage/current converter circuit may generate a current proportional to a value $2^i$ (i is an integer equal to or larger than zero and equal to or smaller than n−1) corresponding to each bit of the n bits, and multiplex the generated currents to output the multi-value current data proportional to the first binary voltage data of the n bits on the data transfer line.

Also, the current comparator circuit may expand the multi-value current data to (2n−1) bits, and outputs the binary current data of the ($2^n-1$) bits, the logical values of which are determined based on whether or not a current value of the multi-value current data is larger than a corresponding threshold current at each of the ($2^n-1$) bits.

Also, the current/voltage converter circuit may convert the binary current data of the ($2^n-1$) bits to the second binary voltage data of the ($2^n-1$) bits in units of bits.

Also, the counter circuit preferably comprises a logic circuit which receives the second binary voltage data of the ($2^n-1$) bits, and restores the first binary voltage data based on positions of bits which have logical "1."

The voltage/current converter circuit may comprise a group of first circuits arranged in parallel in correspondence to the n bits, and each of the first circuits may generate a current proportional to a value 2i (i is an integer equal to or larger than zero and equal to or smaller than n−1) corresponding to a corresponding bit of the n bits. In this event, each of the first circuits preferably comprises a first transistor having a source terminal connected to a power supply terminal or a ground terminal, and a gate terminal and a drain terminal connected to each other, a second transistor applied at a gate terminal with first binary voltage data of the corresponding bit of the n bits from the outside, and having a drain terminal connected to the drain terminal of the first transistor, and a third transistor having a source terminal connected to the power supply terminal or the ground terminal, and a gate terminal connected to the gate terminal of the first transistor. The voltage/current converter circuit further comprises a first constant current source connected between the source terminal of the second transistor in each of the first circuits and the ground terminal or the power supply terminal, and the third transistor in each of the first circuits has a drain terminal connected to the data transfer line in common. Also, the third transistor in each of the first circuits preferably has the gate terminal, the size of which is set to have an output current value proportional to $2^i$ in accordance with the first binary voltage data of n bits supplied from the outside.

Also, the current comparator circuit may comprise a group of second circuits arranged in parallel in correspondence to the ($2^n-1$) bits, and each of the second circuits may set a logical value of a corresponding bit to "1" when a current value of the multi-value current data is larger than a corresponding threshold current. In this event, the current comparator circuit may comprise a fourth transistor which receives the multi-value current data at a drain, and has a gate terminal connected to the drain terminal, and a source terminal connected to a ground terminal or a power supply terminal, and the group of second circuits, and each of the second circuits may comprise a fifth transistor having a gate terminal connected to the gate terminal of the fourth transistor, a source terminal connected to a common ground terminal or a common power supply terminal, and a second constant current source connected between the drain terminal of the fifth transistor and the power supply terminal or ground terminal for applying the threshold current, and the current comparator circuit may output the second binary current data of the ($2^n-1$) bits, the logical value of which is set to "1" from LSB to a bit corresponding to the threshold current. Also, the second constant current source may apply different threshold currents of the ($2^n-1$) bits in predetermined step units, and the current comparator circuit may output binary current data of ($2^n-1$) bits which has a bit corresponding to the largest threshold current at MBS, and a bit corresponding to the smallest threshold current at LSB.

The current/voltage converter circuit may comprise a group of third circuits arranged in parallel in correspondence to the ($2^n-1$) bits of the binary current data, respectively, and each of the third circuits may convert a corresponding bit of the binary current data of the ($2^n-1$) bits to a corresponding bit of the second binary voltage data of ($2^n-1$) bits. In this event, the current/voltage converter circuit may comprise a third constant current source and the group of third circuits, and each of the third circuits may comprise a sixth transistor having a source terminal connected to a common power supply terminal or a common ground terminal, and a gate terminal connected to a drain terminal, and a seventh transistor having a gate terminal for receiving the binary current data of a corresponding bit of the ($2^n-1$) bits, a source terminal connected to the third constant current source, and a drain terminal connected to the drain terminal of the sixth transistor.

Also, the counter circuit may comprise a logic circuit for restoring the first binary voltage data of the n bits which have all bits at logical "0" when all the bits of the second binary voltage data of the ($2^n-1$) bits are logical "0," and restoring the first binary voltage data of the n bits corresponding to a binary number of the number of bits of logical "1" from LSB of the second binary voltage data of the ($2^n-1$) bits. In this event, the counter circuit may comprise a bit determination circuit for three least significant bits, and the bit determination circuit may comprise a first 3-bit input AND circuit for outputting logical "1" when the three least significant bits are logical "1," a second 3-bit input AND circuit for outputting logical "1" when only a third bit is logical "1," and an OR circuit for calculating a logical OR of the output of the first 3-bit input AND circuit and the output of the second 3-bit input AND circuit.

In another aspect of the present invention, an output circuit comprises an input unit for receiving binary voltage data $X_i$ (i is an integer equal to or larger than zero and equal to or smaller than n−1) of n bits (n is an integer equal to or larger than two), and a group of current mirror circuits for outputting current values proportional to $2^i$, and generates a current value proportional to $\Sigma 2^i X_i$ in accordance with the binary voltage data $X_i$ by multiplexing the output currents of the group of current mirror.

Also, in another aspect of the present invention, an output circuit comprises an input unit for receiving binary voltage data $X_i$ (i is an integer equal to or larger than zero and equal to or smaller than n−1) of n bits (n is an integer equal to or larger than two), a first transistor provided for each bit of the n bits of the binary voltage data $X_i$, and having a source terminal connected to a power supply terminal or a ground terminal, and a gate terminal and a drain terminal connected to each other, a second transistor provided for each of the bits, applied with the binary voltage data $X_I$ at a gate terminal thereof, and having a drain terminal connected to the drain terminal of the first transistor, a third transistor provided for each of the bits, and having a source terminal connected to the power supply terminal or the ground terminal, a gate terminal connected to the gate terminal of the first transistor, and a drain terminal connected to a multi-value current data output line, and a constant current source provided for each of the bits, and connected between the source terminal of the second transistor and the ground terminal or the power supply terminal, and multi-value current data having a current value proportional to $\Sigma 2^i X_i$ is output to the multi-value current data output line in accordance with the binary voltage data $X_i$.

Also, in another aspect of the present invention, an output circuit comprises sets of first transistors to third transistors arranged in parallel, corresponding respectively to n bits (n is an integer equal to or larger than two) of binary voltage data Xi (i is an integer equal to or larger than zero and equal to or smaller than n−1) of the n bits supplied from the outside, wherein the first transistor and the third transistor have source terminals connected to a common power supply terminal or a common ground terminal, the second transistor has a source terminal connected to a common regulated current, the third transistor has a drain connected to a common multi-value current data line, and a current value proportional to $\Sigma 2^i X_i$ in accordance with the binary voltage data $X_i$ is output to the common multi-value current data output line. In this event, the third transistor preferably has a size which is set to generate an output current value proportional to $2^i$ in accordance with the binary voltage data $X_i$.

Also, in another aspect of the present invention, an input circuit comprises a current comparator circuit, and a current/voltage converter circuit. The current comparator circuit comprises an input unit for receiving single multi-value current data of $2^n$ values (n is an integer equal to or larger than 2), $(2^n-1)$ independent current mirror circuits, where the multi-value current data is expanded to the $(2^n-1)$ current mirror circuits, and $(2^n-1)$ threshold current sources for supplying threshold currents corresponding to the $2^n$ values of the multi-value current data to the $(2^n-1)$ current mirror circuits, respectively, and outputs binary voltage data of a corresponding bit of $(2^n-1)$ bits based on current driving capabilities of each of the $(2^n-1)$ current mirror circuits and the threshold current from a corresponding one of the $(2^n-1)$ threshold current sources, and the current/voltage converter circuit converts the binary current data of the $(2^n-1)$ bits to binary voltage data of the $(2^n-1)$ bits. In this event, the current comparator circuit may comprise a fourth transistor provided for each bit of the $(2^n-1)$ bits, applied with the multi-value current data at a drain terminal, and having a gate terminal connected to the drain terminal, and a source terminal connected to a common ground terminal or a common power supply terminal, a fifth transistor provided for each of the bits, and having a gate terminal connected to the gate terminal of the fourth transistor, and a source terminal connected to the common ground terminal or the common power supply terminal, and a constant current source provided for each of the bits and connected between the drain terminal of the fifth transistor and the common power supply terminal or the common ground terminal.

Also, in another aspect of the present invention, an input circuit comprises a current comparator circuit, and a current/voltage converter circuit. The current comparator circuit comprises $(2^n-1)$ sets of a fifth transistor arranged in parallel to a single multi-value current dta input of $2^n$ values (n is an integer equal to or larger than two) supplied from the outside, and a threshold current source for outputting a threshold current used to discriminate the multi-value current data, the current comparator circuit has the fifth transistor having a source terminal connected to a common ground terminal or a common power supply terminal, and the threshold current source connected to a common power supply terminal or a common ground terminal, and outputs binary current data of $(2^n-1)$ bits based on the multi-value current data and the threshold current from the threshold current source, and the current/voltage converter circuit converts the binary current data of the $(2^n-1)$ bits to binary voltage data of the $(2^n-1)$ bits. In this event, the current comparator circuit may detect a bit corresponding to the multi-value current data within the $(2^n-1)$ bits based on a drain current of the fifth transistor and the threshold current of the threshold current source, and output the binary current data of the $(2^n-1)$ bits having a bit corresponding to the largest threshold current at the most significant bit.

Also, the current/voltage converter circuit may comprise $(2^n-1)$ circuit units arranged in parallel to the binary current data inputs of the $(2^n-1)$ bits, each of the $(2^n-1)$ circuit units may comprise a sixth transistor and a seventh transistor, the sixth transistor may have a source terminal connected to the common power supply terminal or the common ground terminal, and the sixth transistor may have a gate terminal and a drain terminal connected to each other, the seventh transistor may have a source terminal connected to a third constant current source, the seventh transistor may have a gate terminal applied with the binary current data of a corresponding bit of the $(2^n-1)$ bits, and the binary voltage data of the corresponding bit may be output from the drain terminal of the sixth transistor connected to the drain terminal of the seventh transistor. In this event, the third constant current source may be set to output the binary voltage data having a voltage level indicative of logical "0" or "1" for each of the $(2^n-1)$ bits of the binary current data, and the current/voltage converter circuit may output the binary voltage data of the $(2^n-1)$ bits having binary voltage data corresponding to binary current data at the most significant bit at the most significant bit, and binary voltage data corresponding to binary current data at the least significant bit at the least significant bit.

Also, a semiconductor device may comprise the aforementioned output circuit or the aforementioned input circuit. Also, an electronic apparatus may comprise the aforementioned output circuit or the aforementioned input circuit.

BEST MODE FOR CARRYING OUT THE INVENTION

In the following, a data transfer circuit of the present invention will be described in detail with reference to the accompanying drawings.

Figure 1:
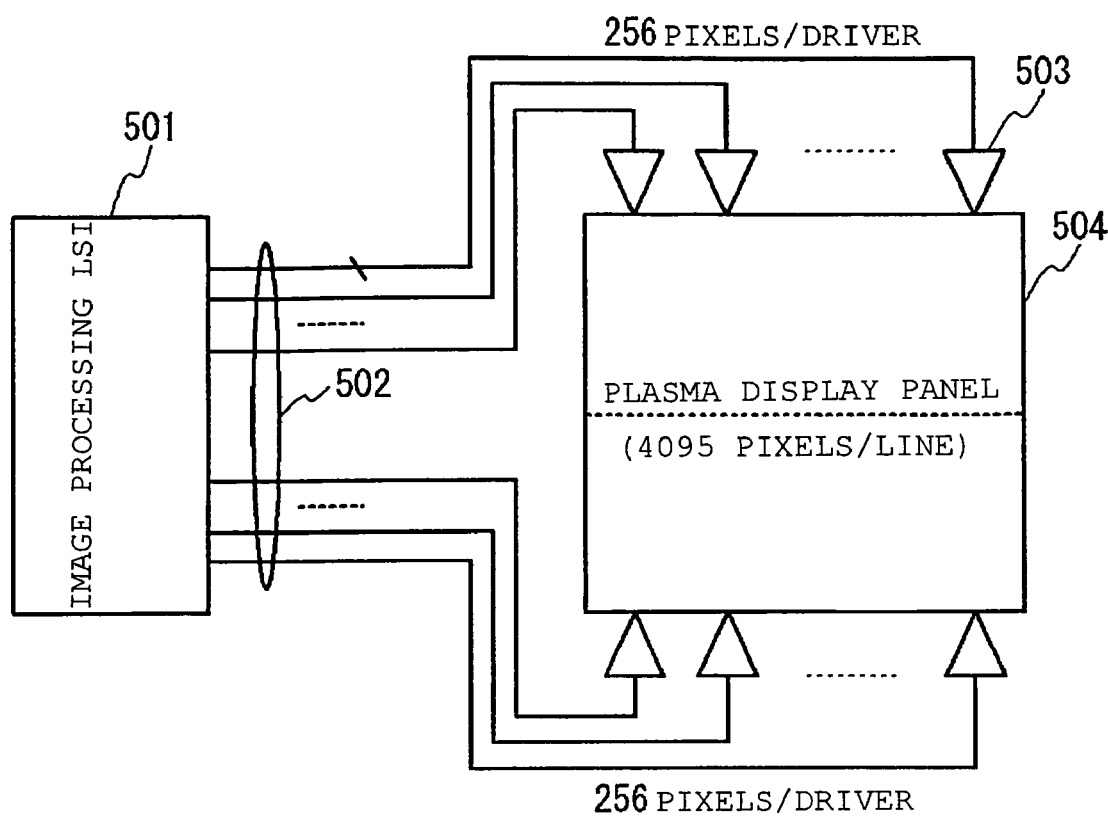
FIG. 1 is a block diagram showing the configuration of a digital image processing apparatus of a first prior art example including a plasma display panel.
Figure 2:
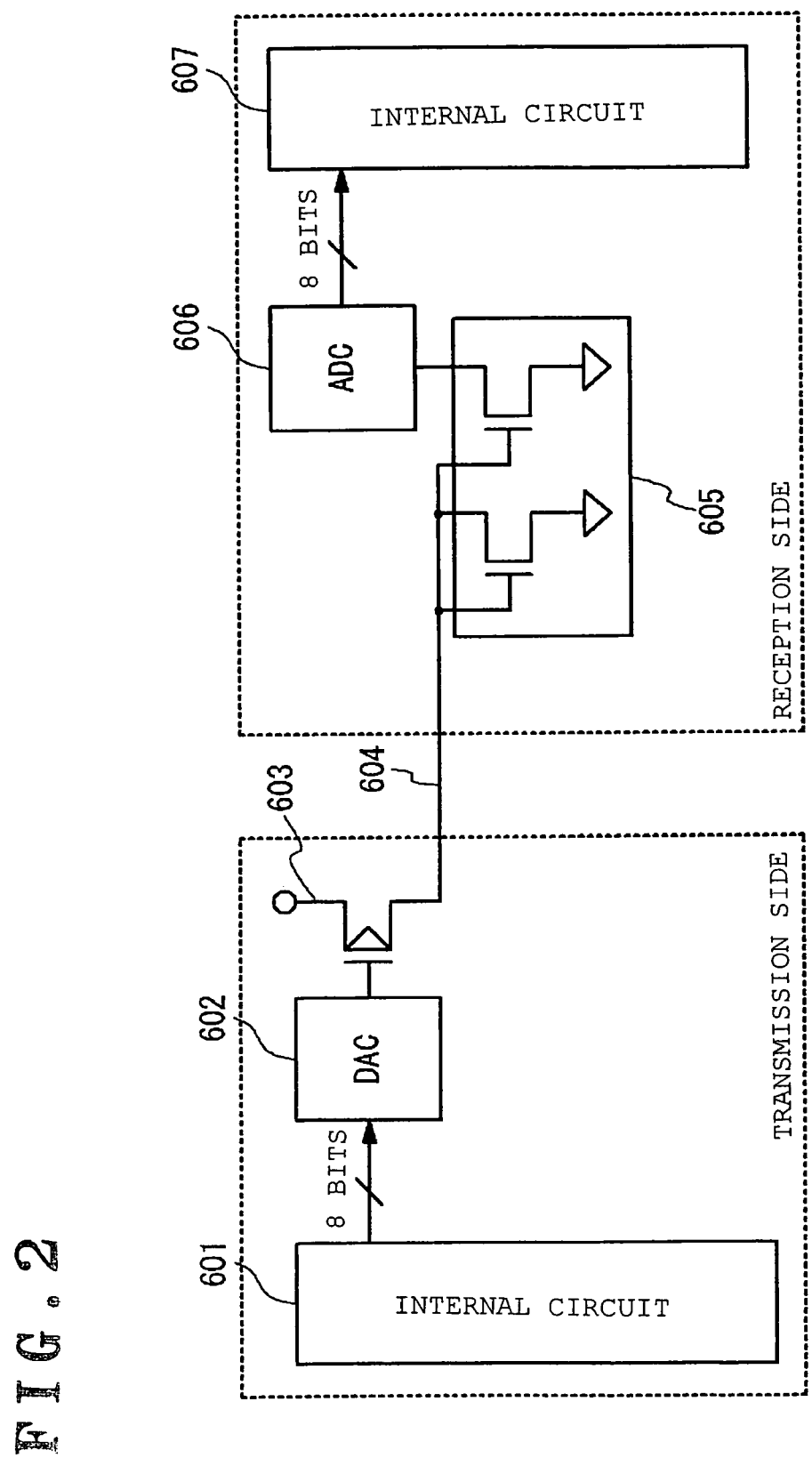
FIG. 2 is a block diagram showing the configuration of a data transmission system of a second prior art example.
Figure 3:
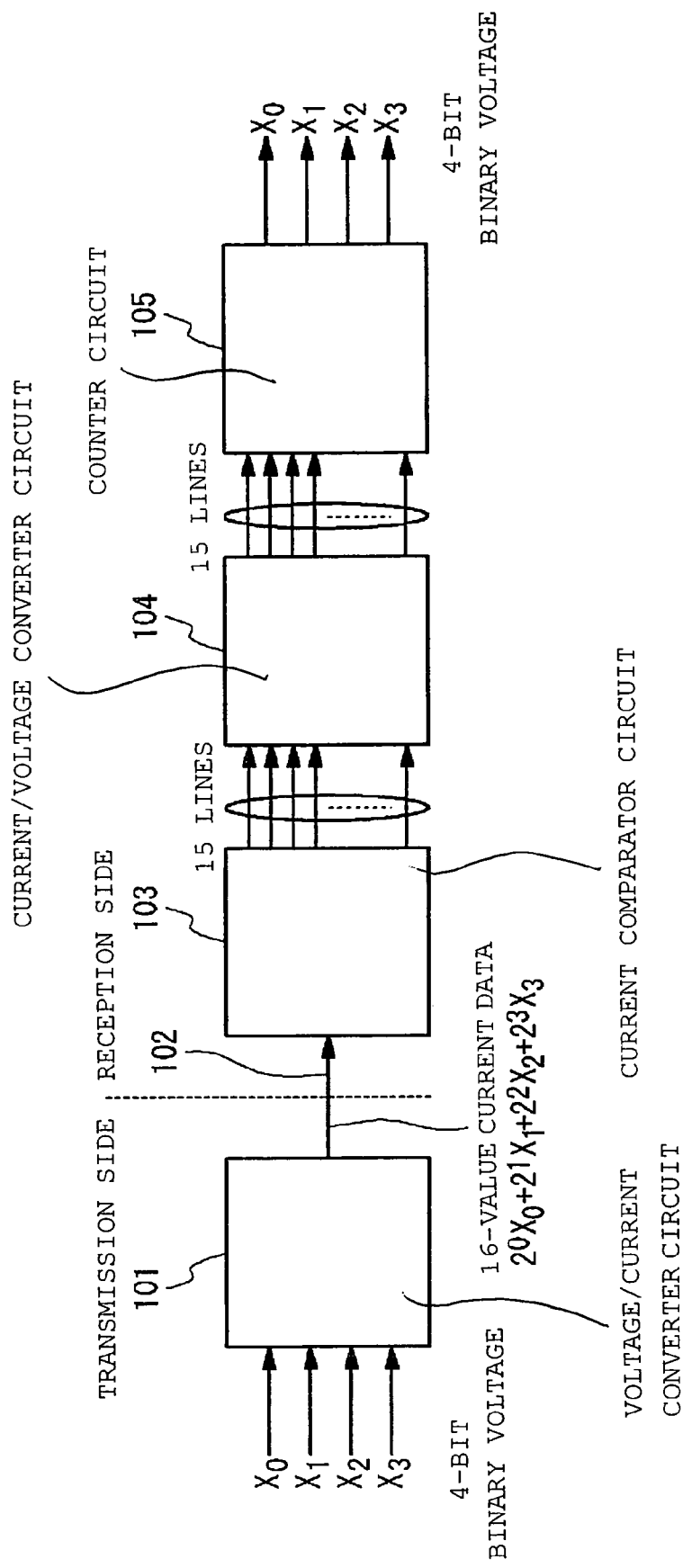
FIG. 3 is a block diagram showing the configuration of a data transfer circuit of the present invention.

FIG. 3 is a block diagram showing the configuration of the data transfer circuit of the present invention. In this example, 16-value current data is transferred. Referring to FIG. 3, the data transfer circuit comprises a voltage/current converter circuit 101, a data transfer unit 102, a current comparator circuit 103, a current/voltage converter circuit 104, and a counter circuit 105.

The voltage/current converter circuit 101 is provided on the transmission side. 4-bit binary voltage data ($X_3, X_2, X_2, X_0$) supplied to the voltage/current converter circuit 101 from the outside is converted to 16-value current data proportional to $2^0 X_0 + 2^1 X_1 + 2^2 X_2 + 2^3 X_2$ by the voltage/current converter circuit 101. The 16-value current data output from the voltage/current converter circuit 101 is transferred to the reception side by the data transfer unit 102. Here, the binary voltage data takes either logical "0" or logical "1," while the 16-value current data takes one from logical "0" to logical "15."

On the reception side, 16-value current data is output as 15-bit binary current data based on a current value of each bit by the current comparator circuit 103. Here, the binary current data takes either logical "0" or logical "1." 16-value current data of logical "0" is represented by binary current data having all bits at logical "0," and 16-value current data from logical "1" to logical "15" are represented as binary current data which have corresponding bits at logical "1."

Next, 15-bit binary current data is converted to 15-bit binary voltage data by the current/voltage converter circuit 104. Here, the correspondence of the 15-bit binary voltage data to the 16-value current data is similar to the case of the 15-bit binary current data.

Finally, the number of logical "1" in the 15-bit binary voltage data is counted by the counter circuit 105 to restore original 4-bit binary voltage data.

Figure 4:
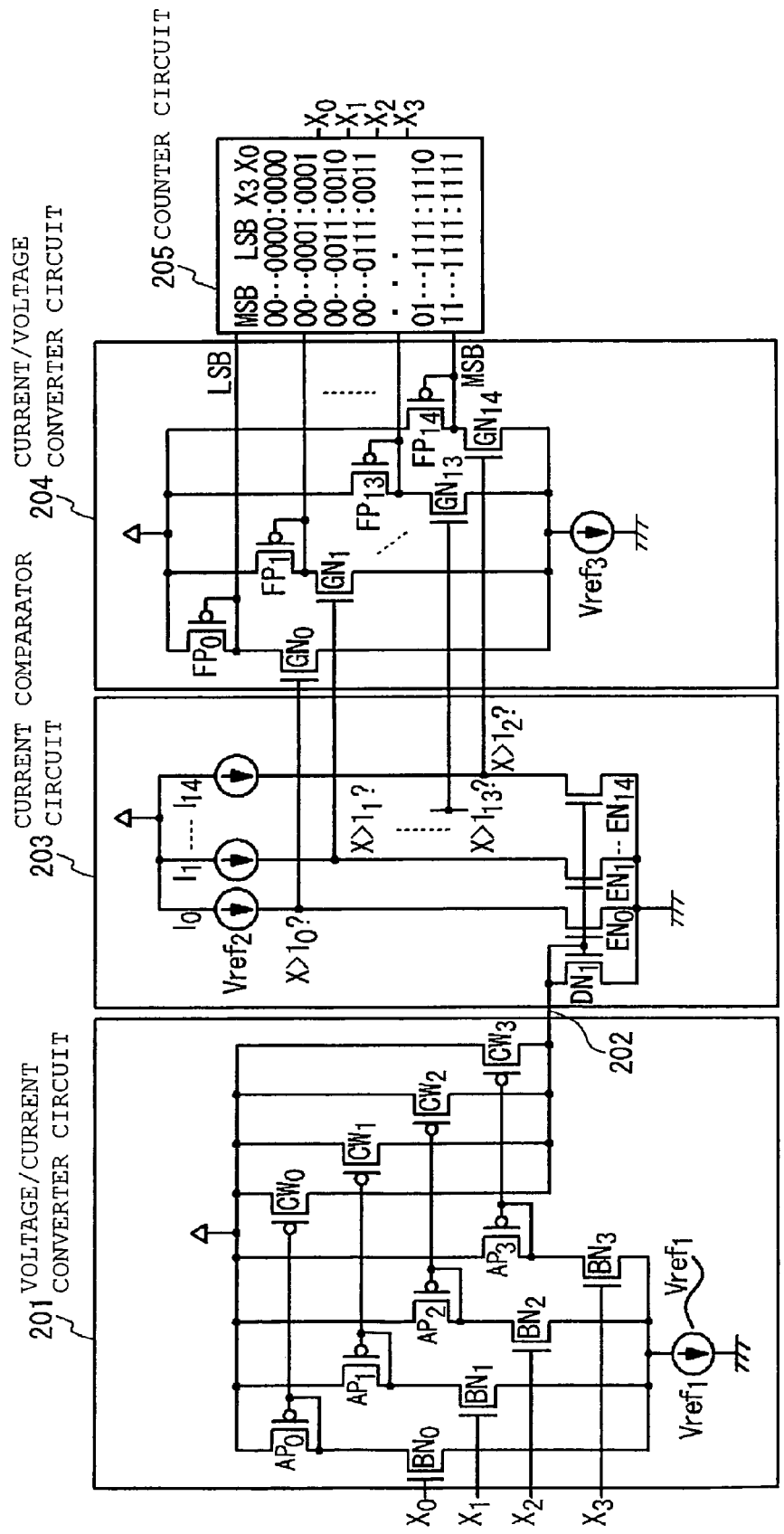
FIG. 4 is a circuit diagram showing a detailed circuit configuration of a data transfer circuit according to a first embodiment of the present invention.

FIG. 4 is a circuit diagram showing the circuit configuration of a data transfer circuit according to a first embodiment of the present invention. The transfer circuit comprises a voltage/current converter circuit 201, a data transfer line 202, current comparator circuit 203, current/voltage converter circuit 204, and a counter circuit 205. This circuit configuration is adapted to a transfer of 16-bit current data, and is modified as appropriate depending on the number of bits.

The voltage/current converter circuit 201 is provided on the transmission side. The voltage/current converter circuit 201 comprises first PMOS transistors $AP_3, AP_2, AP_1, AP_0$, second NMOS transistors $BN_3, BN_2, BN_1, BN_0$, third PMOS transistors $CW_3, CW_2, CW_1, CW_0$, and a first constant current source $V_{ref1}$.

In each of the first transistors $AP_3, AP_2, AP_1, AP_0$, a source terminal is connected to a power supply terminal, while a gate terminal is connected to a drain terminal. Further, the gate terminal of each of the first transistors $AP_3, AP_2, AP_1, AP_0$ is connected to a gate terminal of a corresponding one of the third transistors $CW_3, CW_2, CW_1, CW_0$. Further, the drain terminal of each of the first transistors $AP_3, AP_2, AP_1, AP_0$ is connected to a drain terminal of a corresponding one of the second transistors $BN_3, BN_2, BN_1, BN_0$. In each of the second transistors $BN_3, BN_2, BN_1, BN_0$, a gate terminal is supplied with a corresponding one of binary voltage data $X_3, X_2, X_2, X_0$ from the outside. The drain terminal of each of the second transistors $BN_3, BN_2, BN_1, BN_0$ is connected to the drain terminal of the first transistors $AP_3, AP_2, AP_1, AP_0$, respectively. Source terminals of the second transistors $BN_3, BN_2, BN_1, BN_0$ are connected to the first constant current source $V_{ref1}$. In the third transistors $CW_3, CW_2, CW_1, CW_0$, source terminals are connected to a power supply terminal. Each of the third transistors $CW_3, CW_2, CW_1, CW_0$ has the gate terminal connected to the gate terminal of a corresponding one of the first transistors $AP_3, AP_2, AP_1, AP_0$. Each of the third transistors $CW_3, CW_2, CW_1, CW_0$ has a drain terminal connected to a multi-value current data output line 202 as a common node. The first constant current source $V_{ref1}$ is connected between the source terminals of the second transistors $BN_3, BN_2, BN_1, BN_0$ and a ground.

In the voltage/current converter circuit 201, four sets of current mirror circuits are connected in parallel by sets of transistors $(BN_0, AP_0, CW_0)$-$(BN_3, AP_3, CW_3)$ and the first constant current source $V_{ref1}$. The four sets of current mirror circuits output currents having a current ratio of 1:2:4:8 from the third PMOS transistors $CW_3, CW_2, CW_1, CW_0$. Thus, each of the third transistors $CW_3, CW_2, CW_1, CW_0$ has the gate, the size of which is set to be able to output a current value twice, four times, and eight times as many as the third transistor $CW_0$. As the binary voltage data $X_3, X_2, X_2, X_0$ are supplied to the gates of the second transistors $BN_3, BN_2, BN_1, BN_0$, currents flowing into the drain terminals of the third transistors $CW_3, CW_2, CW_1, CW_0$ are multiplexed and output as 16-value current data proportional to $2^0 X_0 + 2^1 X_1 + 2^2 X_2 + 2^3 X_2$ from a common node to the data transfer line 202 which is a single wire line. The first constant current source $V_{ref1}$ is set to define a maximum value for currents which flow through the second transistors $BN_3$, $BN_2$, $BN_1$, $BN_0$, and the first transistors $AP_3$, $AP_2$, $AP_1$, $AP_0$ corresponding to them, respectively.

Further, a description will be given of the case where binary voltage data supplied from the outside has n bits.

N circuit sections comprised of the first transistors $AP_0$-$AP_{n-1}$-third transistors $CW_0$-$CW_{n-1}$ of the voltage/current converter circuit are arranged in parallel to n-bit binary voltage data supplied from the outside. The first transistor $AP_i$ and third transistor $Cw_i$ included in each of the circuit sections have source terminals connected to a common power supply terminal. The source terminals of the second transistors $BN_0$-$BN_{n-1}$ are connected to the first constant current source $V_{ref1}$. The drain terminals of the third transistors $CW_0$-$CW_{n-1}$ are connected to the multi-value current data output line 202 as a common node. The output of the voltage/current converter circuit 201 is performed to the multi-value current data output line 202. Further, the sizes of the third transistor $CW_0$-$CW_{n-1}$ in the voltage/current converter circuit 201 are set to have output current values proportional to $2^i$ (i=0-n-1) in accordance with weights of n-bit binary voltage data supplied from the outside. The multi-value current data is transferred from the voltage/current converter circuit 201 on the transmission side to the current comparator circuit 203 on the reception side through the multi-value current data output line 202.

The current comparator circuit 203 comprises a fourth NMOS transistor $DN_1$, fifth NMOS transistors $EN_0$-$EN_{14}$, and a second constant current source $V_{ref2}$ comprised of threshold current sources $I_0$-$I_{14}$. In the fourth transistor $DN_1$, the multi-value current data is applied to a drain terminal. The drain terminal and gate terminal of the fourth transistor $DN_1$ are connected, and a source terminal thereof is grounded. In each of the fifth transistors $EN_0$-$EN_{14}$, a gate terminal is connected to the gate terminal of the fourth transistor $DN_1$, and a source terminal is grounded. Each of the fifth transistors $EN_0$-$EN_{14}$ has a drain terminal connected to the threshold current source $I_0$-$I_{14}$. The threshold current sources $I_0 I_{14}$ are connected between the drain terminals of the fifth transistors $EN_0$-$EN_{14}$ and the power supply terminal. In this way, the fourth transistor $DN_1$ and each of the fifth transistors $EN_0$-$EN_{14}$ make up a current mirror circuit.

Each of the fifth transistors $EN_0$-$EN_{14}$ has the gate, the size of which is set such that it can apply a current having a current value equivalent to the fourth transistor $DN_1$. They serve to copy 15 of the 16-value current data supplied from the data transfer line 202 to the fourth transistor $DN_1$. Further, each of the threshold current sources $I_0$-$I_{14}$ connected in series to the fifth transistors $EN_0$-$EN_{14}$ supplies a threshold current to a corresponding fifth transistor. The threshold currents correspond to 15 values indicated by binary voltage data supplied to the voltage/current converter circuit 201. For example, the fifth NMOS transistor $EN_i$ is supplied with the threshold current $I_i$. In this way, a source-drain voltage of the fifth NMOS transistor $EN_i$ increases when the threshold current $I_i$ exceeds the value of current which is to be applied by the fifth NMOS transistor based on the 16-value current data. Conversely, the source-drain voltage of the fifth NMOS transistor $EN_i$ decreases when threshold current $I_i$ is exceeded by the value of current which is to be applied by the fifth NMOS transistor based on the 16-value current data. In this way, the 16-value current data is compared in magnitude with each threshold current to simultaneously deliver 15-bit binary current data at the drain terminals of the respective fifth transistors $EN_0$-$EN_{14}$ as the result of the comparison, rather than in time series. Here, the result of the comparison with the largest threshold current source is designated the most significant bit MSB, while the result of the comparison with the smallest threshold current source is designated the least significant bit LSB. The threshold current sources $I_0$-$I_{14}$ supply threshold currents to corresponding mirror circuits.

Figure 6:
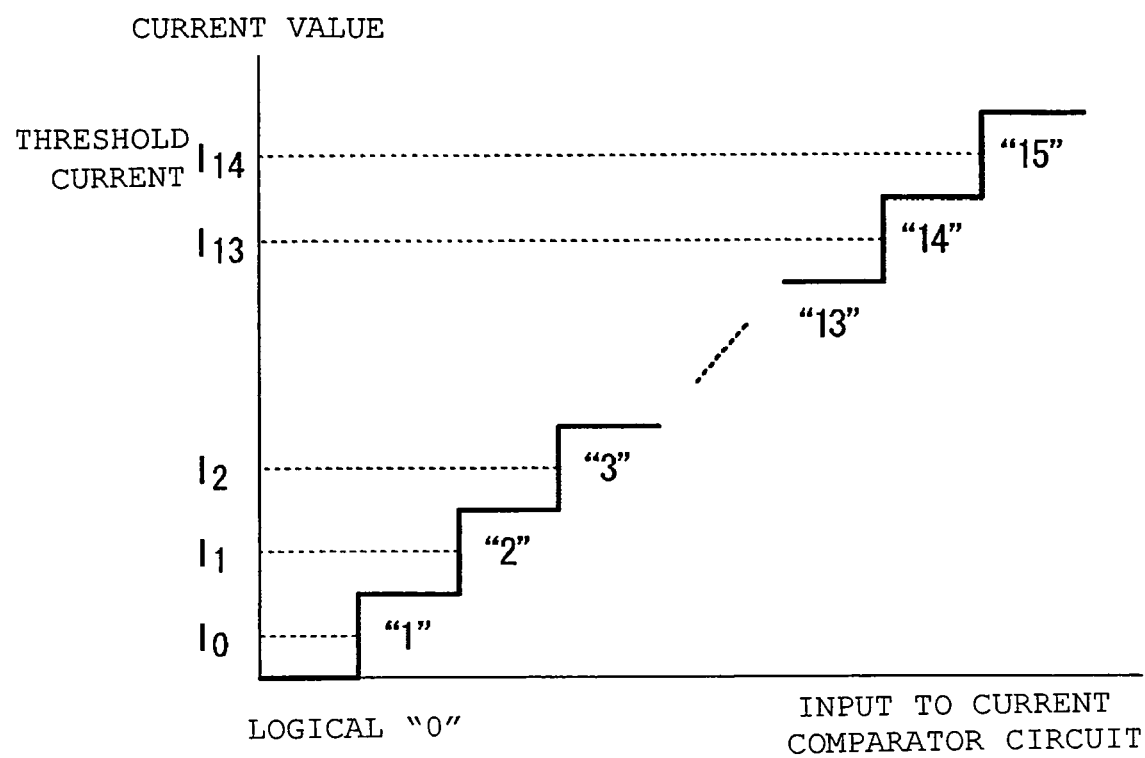
FIG. 6 is a diagram showing the relationship between threshold current sources and logic of 16-value current data.

However, as shown in FIG. 6, assume that the threshold current source $I_0$-$I_{14}$ are set to values which can discriminate from logical "1" to logical "15" of 16-value current data. For example, the threshold current source $I_0$ is set to a value which can discriminate logical "0" of the 16-value current from values more than that (from logical "1" to logical "15"); the threshold current source $I_1$ to a value which can identify logical "1" or less (logical "0" and logical "1") of the 16-value current data from values more than those (from logical "2" to logical "15"); and the threshold current source $I_{14}$ to a value which can identify logical "14" or less (from logical "0" to logical "14") of the 16-value current data from the value more than those (logical "15").

A description will be made of the case where binary voltage data supplied from the outside has n bits. In the current comparator circuit 203, $2^n-1$ circuit portions composed of the fifth transistors $EN0$-$EN''_{2-2}$ and threshold current sources $I_0$-$I''_{2-2}$ are arranged in parallel to multi-value current data inputs of $n^2$ values. The source terminal of the fifth transistor $EN_0$-$EN''_{2-2}$ included in each of the circuit portions is grounded, the threshold current sources $I_0$-$I''_{2-2}$ are connected to a common power supply terminal, and the result of a comparison by the current comparator circuit 203 is output from the drain terminals of the fifth transistors $EN0$-$EN''_{2-2}$. The threshold current sources $I_0$-$I''_{2-2}$ of the current comparator circuit 203 are set to have current $2^n-1$ kinds of current thresholds which can discriminate multi-value current data of $2^n$ values. The current comparator circuit 203 compares a multi-value current data input value with each current threshold, and outputs $(2^n-1)$-digit weighted binary current data which has the result of the comparison with the largest current threshold at the most significant digit, and the result of the comparison with the smallest current threshold at the least significant digit.

The current/voltage converter circuit 204 comprises sixth PMOS transistors $FP_0$-$FP_{14}$, and seventh NMOS transistors $GN_0$-$GN_{14}$, and a third constant current source $V_{ref3}$. In each of the sixth transistors $FP_0$-$FP_{14}$, a source terminal is connected to a power supply terminal, and a gate terminal is connected to a drain terminal. Further, each of the sixth transistors $FP_0$-$FP_{14}$ has a gate terminal connected to the counter circuit 205. Further, each of the sixth transistors $FP_0$-$FP_{14}$ has the drain terminal connected to a drain terminal of a corresponding one of the seventh transistors $GN_0$-$GN_{14}$. In each of the seventh transistors $GN_0$-$GN_{14}$, a gate terminal is supplied with binary current data of a corresponding bit from the current comparator circuit 203. Each of the seventh transistors $GN_0$-$GN_{14}$ has the drain terminal connected to the drain terminal of a corresponding one of the sixth transistors $FP_0$-$FP_{14}$. Each of the seventh transistors $GN_0$-$GN_{14}$ has a source terminal connected to the third constant current source $V_{ref3}$. The third constant current source $V_{ref3}$ is connected between the source terminal of each of the seventh transistors $GN_0$-$GN_{14}$ and a ground terminal.

In the current comparator circuit 203, a source-drain voltage of the fifth NMOS transistor increases when the threshold current $I_i$ exceeds the value of current which is to be applied by the fifth NMOS transistor based on the 16-value current data. Conversely, the source-drain voltage of the fifth NMOS transistor $EN_i$ decreases when threshold current $I_i$ is exceeded by the value of current which is to be applied by the fifth NMOS transistor based on the 16-value current data. In the current/voltage converter circuit 204, a gate voltage of the seventh transistor $GN_i$ increases when the threshold current $I_i$ exceeds the value of current which is to be applied by the fifth NMOS transistor based on the 16-value current data, causing the seventh transistor $GN_i$ to turn on to bring a corresponding bit to logical "0." On the other hand, the gate voltage of the seventh transistor $GN_i$ decreases when threshold current $I_i$ is exceeded by the value of current which is to be applied by the fifth NMOS transistor based on the 16-value current data, causing the seventh transistor $GN_i$ to turn off to bring the corresponding bit to logical "1." In this way, 15-bit binary current data, which is the output. of the current comparator circuit 203, is converted to 15-bit binary voltage data having a proper voltage level which is then output. The third constant current source $V_{ref3}$ is provided for performing a level shift of the output voltage.

Further, a description will be given for the case where the binary voltage data supplied from the outside has n bits. $2^n-1$ of circuit portions composed of the sixth PMOS transistors $FP_0$-$FP''_{2-2}$ and seventh NMOS transistors $GN_0$-$GN''_{2-2}$ of the current/voltage converter circuit are arranged in parallel to $2^n-1$ binary current data inputs. The source terminal of each of the sixth transistor $FP_0$-$FP''_{2-2}$ included in each of the circuit portions is connected to the power supply terminal. The source terminal of each of the seventh transistors $GN_0$-$GN''_{2-2}$ is connected to the third constant current source $V_{ref3}$. The result of a conversion by the current/voltage converter circuit 204 is output from the drain of each of the sixth transistors $FP_0$-$FP''_{2-2}$. The third constant current source $V_{ref3}$ of the current/voltage converter circuit 204 is set to output a voltage level which can be discriminated as binary voltage data indicative of logical "0" or logical "1" to $2^n-1$ digit binary current data. In this way, the current/voltage converter circuit 204 outputs $(2^n-1)$-digit weighted binary current data which has the result of the comparison with the largest current threshold at the most significant digit, and the result of the comparison with the smallest current threshold at the least significant digit.

The counter circuit 205 in turn is a logic circuit for restoring the original 4-bit input data $X_3, X_2, X_1, X_0$ supplied to the voltage/current converter circuit 201 from the 15-bit binary voltage data which is the output of the current/voltage converter circuit, and its operation conforms to a shown truth table. The counter circuit 205 is a so-called decoder. The counter circuit comprises a logic circuit which corresponds the number of logical "1" in $2^n-1$ binary voltage data inputs to an n-bit binary number, where the n-bit output is set to "0" when the $2^{n-1}$ binary voltage data inputs are all at logical "0."

Figure 5:
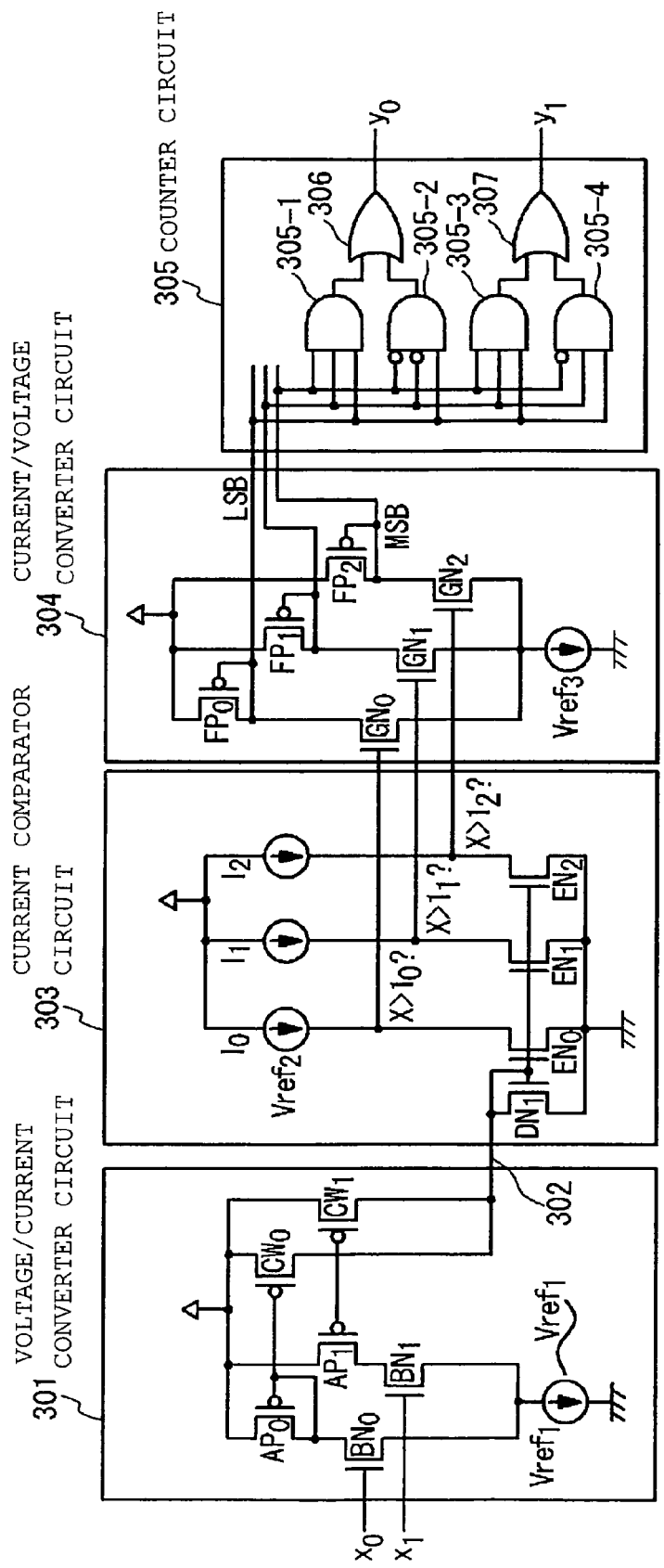
FIG. 5 is a circuit diagram showing the circuit configuration of a data transfer circuit according to a second embodiment of the present invention.

FIG. 5 is a circuit diagram showing a second embodiment of the data transfer circuit of the present invention. In this example, an example of transferring four-value current data is shown.

The transfer circuit comprises a voltage/current converter circuit 301, a data transfer line 302, a current comparator circuit 303, a current/voltage converter circuit 304, and a counter circuit 305. The operation is similar except for modifications required to apply the voltage/current converter circuit 201, current comparator circuit 203, current/voltage converter circuit 204, and counter circuit 205, shown in the first embodiment, to four-value current data.

The counter circuit 305 has three-input AND circuits 305-1-305-4, and OR circuits 306 and 307. The AND circuit 305-2 receives an inverted version of the zero-th bit and first bit of 3-bit binary voltage data output from the current/voltage converter circuit 204. The AND circuit 305-4 in turn receives an inverted version of the third bit. The outputs of the AND circuits 305-1 and 305-2 are supplied to the OR circuit 306, while the outputs of the AND circuits 305-3 and 305-4 are supplied to the OR circuit 307. In this way, a truth table shown in FIG. 4 is realized for 2-bit binary voltage data. In this way, for the least significant three bits, 3-bit voltage data is converted to 2-bit binary voltage data in accordance with the example described above.

It will be apparent that the upper four bits of the voltage data are converted to 2-bit binary voltage data in a similar manner.

While the data transfer circuits for 16-value and 4-value multi-value current data have been described above in detail, it will be apparent that the present invention can be applied in principle to a transfer of arbitrary multi-value current data, including higher order multi-value encoding.

The data transfer circuit of the present invention converts binary voltage data to binary current data on the transmission side and transfers the binary current data. Therefore, it is less susceptible to the influence of noise. Further, the sizes of the third transistors $CW0$-$CW_{n-1}$ in the voltage/current converter circuit 201 are set to have output current values proportional to $^i$ (i=0-n-1) in accordance with weights of n-bit binary voltage data supplied from the outside. Consequently, the data transfer circuit is less susceptible to the influence of noise, and requires a smaller amount of hardware than prior art circuits for converting from binary voltage data to multi-value current data.

The data transfer method and circuit of the present invention can restore original binary voltage data from multi-value current data on the reception side faster than prior art circuits.

Figure 7:
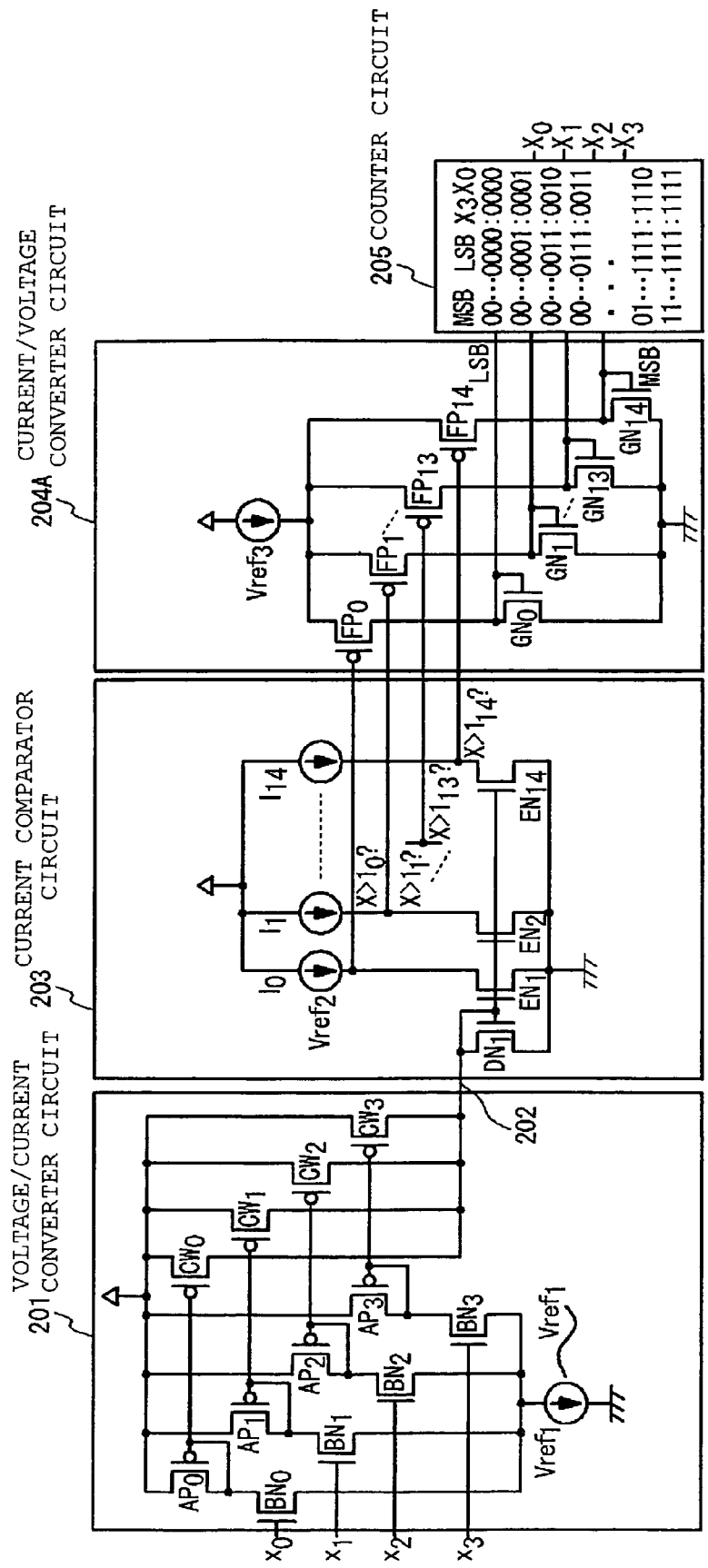
FIG. 7 is a circuit diagram showing the circuit configuration of a data transfer circuit according to a third embodiment of the present invention.

Next, a data transfer circuit according to a third embodiment of the present invention will be described with reference to FIG. 7. Referring to FIG. 7, the data transfer circuit of the third embodiment comprises a voltage/current converter circuit 201, a data transfer unit 202, a current comparator circuit 203, a current/voltage converter circuit 204A, and a counter circuit 205. The data transfer circuit according to the third embodiment of the present invention is basically similar to the data transfer circuit of the first embodiment. A different aspect lies in that the configuration of the current/voltage circuit 204A is different.

The current/voltage converter circuit 204A comprises sixth PMOS transistors $FP_0$-$FP_{14}$, and seventh NMOS transistors $GN_0$-$GN_{14}$, and a third constant current source $V_{ref3}$. In each of the sixth transistors $FP_0$-$FP_{14}$, a source terminal is connected to the third constant current source $V_{ref3}$, and a gate terminal is supplied with binary current data of a corresponding bit from the current comparator circuit 203. Each of the sixth transistors $FP_0$-$FP_{14}$ has a drain terminal connected to the counter circuit 205. Each of the sixth transistors $FP_0$-$FP_{14}$ has a source terminal connected to a drain terminal of a corresponding one of the seventh transistors $GN_0$-$GN_{14}$. Each of the seventh transistors $GN_0$-$GN_{14}$ has a gate terminal connected to a drain terminal thereof. Each of the seventh transistors $GN_0$-$GN_{14}$ has a grounded source terminal. The current/voltage converter circuit 204A converts 15-bit binary current data, which is the output of the current comparator circuit 203, to 15-bit binary voltage data having a proper voltage level which is then output. The third constant current source $V_{ref3}$ is provided for performing a level shift of the output voltage.

As described above, in the data transfer circuit of the third embodiment, the seventh NMOS transistors and six PMPS transistors change functions in the current/voltage converter circuit 204 of FIG. 4, so that the output of the current comparator is applied to the PMOS transistors $FP_0$-$FP_{14}$. Also, the drain output of each of the NMOS transistors $GN_0$-$GN_{14}$ is applied to the counter circuit to restore the original input data $X_0$-$X_3$.

Figure 8:
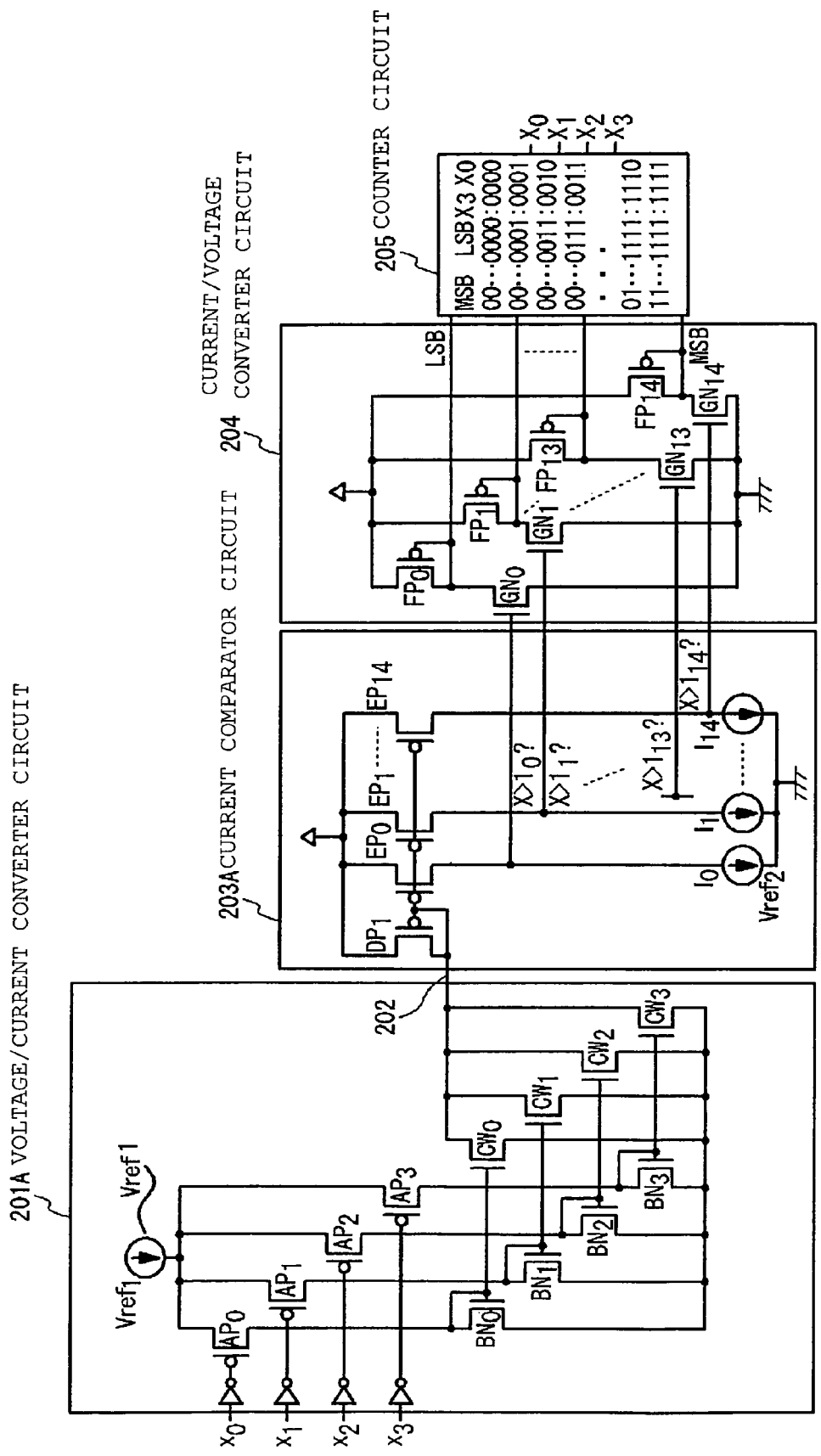
FIG. 8 is a circuit diagram showing the circuit configuration of a data transfer circuit according to a fourth embodiment of the present invention.

Next, a data transfer circuit according to a fourth embodiment of the present invention will be described with reference to FIG. 8. Referring to FIG. 8, the data transfer circuit of the fourth embodiment comprises a voltage/current converter circuit 201A, a data transfer unit 202, a current comparator circuit 203A, a current/voltage converter circuit 204, and a counter circuit 205. The data transfer circuit according to the fourth embodiment of the present invention is basically similar to the data transfer circuit of the first embodiment. A different aspect lies in that the voltage/current converter circuit 201A differs from current comparator circuit 203A in configuration.

The voltage/current converter circuit 201A is provided on the transmission side. The voltage/current converter circuit 201A comprises first PMOS transistors $AP_3$, $AP_2$, $AP_1$, $AP_0$, second NMOS transistors $BN_3$, $BN_2$, $BN_1$, $BN_0$, third PMOS transistors $CW_3$, $CW_2$, $CW_1$, $CW_0$, inverters $IV_0$-$IV_3$, and a first constant current source $V_{ref1}$. In the voltage/current converter circuit 201A, four sets of current mirror circuits are connected in parallel by sets of transistors ($BN_0$, $AP_0$, $CW_0$)-($BN_3$, $AP_3$, $CW_3$) and the first constant current source $V_{ref1}$.

The first constant current source $V_{ref1}$ is connected to a power supply terminal. In each of the first transistors $AP_3$, $AP_2$, $AP_1$, $AP_0$, a source terminal is connected to the first constant current source $V_{ref1}$. A gate terminal is supplied with binary voltage data through a corresponding one of the inverters $IV_0$-$IV_3$. Each of the first transistors $AP_3$, $AP_2$, $AP_1$, $AP_0$ has a drain terminal connected to a drain terminal of a corresponding one of the second transistors $BN_3$, $BN_2$, $BN_1$, $BN_0$. Source terminals of the second transistors $BN_3$, $BN_2$, $BN_1$, $BN_0$ are grounded. Also, the gate terminal of each of the second transistors $BN_3$, $BN_2$, $BN_1$, $BN_0$ is connected to a gate terminal of a corresponding one of the third transistors $CW_3$, $CW_2$, $CW_1$, $CW_0$. Source terminals of the third transistors $CW_3$, $CW_2$, $CW_1$, $CW_0$ are also grounded. Further, the third transistors $CW_3$, $CW_2$, $CW_1$, $CW_0$ have their drains connected to the multi-value current data output line 202 as a common data transfer unit. In this way, sets of the second transistors $BN_3$, $BN_2$, $BN_1$, $BN_0$ and third transistors $CW_3$, $CW_2$, $CW_1$, $CW_0$ corresponding thereto form current mirror circuits.

The four sets of current mirror circuits output currents having a current ratio of 1:2:4:8 from the third PMOS transistors $CW_3$, $CW_2$, $CW_1$, $CW_0$. Thus, each of the third transistors $CW_3$, $CW_2$, $CW_1$, $CW_0$ has the gate, the size of which is set to be able to output a current value twice, four times, eight times as many as the third transistor $CW_0$. The binary voltage data $X_3$, $X_2$, $X_2$, $X_0$ are supplied to the gates of the first transistors $AP_3$, $AP_2$, $AP_1$, $AP_0$, respectively, through the inverters $IV_0$-$IV_3$. When supplied to the gate terminals, respectively, currents flowing through the drain terminals of the third transistors $CW_3$, $CW_2$, $CW_1$, $CW_0$ are multiplexed and output as 16-value current data proportional to $2^0X_0+2^1X_1+2^2X_2+2^3X_2$ from a common node to the data transfer line 202 which is a single wire line. The first constant current source $V_{ref1}$ is provided for defining a maximum value for currents which flow through the second transistors $BN_3$, $BN_2$, $BN_1$, $BN_0$, and the first transistors $AP_3$, $AP_2$, $AP_1$, $AP_0$ corresponding to them, respectively.

Also, the current comparator circuit 203A comprises a fourth NMOS transistor $DN_1$, fifth NMOS transistors $EN_0$-$EN_{14}$, and a second constant current source $V_{ref2}$ comprised of threshold current sources $I_0$-$I_{14}$. In the fourth transistor $DN_1$, the multi-value current data is applied to a drain terminal. The drain terminal and gate terminal of the fourth transistor DN1 are connected, and a source terminal is grounded. In each of the fifth transistors $EN_0$-$EN_{14}$, a gate terminal is connected to its drain terminal and to the gate terminal of the fourth transistor $DN_1$, and a source terminal is connected to the power supply terminal. Each of the fifth transistors $EN_0$-$EN_{14}$ has a drain terminal connected to the threshold current sources $I_0$-$I_{14}$. The threshold current sources $I_0$-$I_{14}$ are connected between the drain terminals of the fifth transistors $EN_0$-$EN_{14}$ and the ground. In this way, the fourth transistor $DN_1$ and each of the fifth transistors $EN_0$-$EN_{14}$ make up a current mirror circuit.

Each of the fifth transistors $EN_0$-$EN_{14}$ has the gate, the size of which is set. such that it can apply a current having a current value equivalent to the fourth transistor $DN_1$. They serve to copy 15 of the 16-value current data supplied from the data transfer line 202 to the fourth transistor $DN_1$. Further, the threshold current sources $I_0$-$I_{14}$ are connected in series to the fifth transistors $EN_0$-$EN_{14}$, thereby providing 15-bit binary current data, as the result of a comparison, at the drain terminals of the respective fifth transistors $EN_0$-$EN_{14}$ based on 16-value current data and each threshold current. Here, the result of the comparison with the largest threshold current source is designated the most significant bit MSB, while the result of the comparison with the smallest threshold current source is designated the least significant bit LSB.

However, as shown in FIG. 6, assume that the threshold current source $I_0$-$I_{14}$ are set to values which can discriminate from logical "1" to logical "15" of 16-value current data. For example, the threshold current source $I_0$ is set to a value which can discriminate logical "0" of the 16-value current from values more than that (from logical "1" to logical "15"); the threshold current source $I_1$ to a value which can identify logical "1" or less (logical "0" and logical "1") of the 16-value current data from values more than those (from logical "2" to logical "15"); and the threshold current source $I_{14}$ to a value which can identify logical "14" or less (from logical "0" to logical "14") of the 16-value current data from the value more than those (logical "15").

In the current/voltage converter circuit 201A, values produced by inverting 4-bit binary voltage data $X_0$-$X_3$ by the inverters $IV_0$-$IV_3$ are supplied to the gate terminals of the first transistors $AP_3$, $AP_2$, $AP_1$, $AP_0$. The drains of the third transistors $CW_3$, $CW_2$, $CW_1$, $CW_0$ inhale 16-value current data proportional to the total $2^0X_0+2^1X_1+2^2X_2+2^3X_2$ from the PMOS transistor $DP_1$ of the current comparator circuit 203A through the data transfer line 202, and apply the current data to the current comparator circuit 203A. The binary current data output of the current comparator circuit 203A is converted to binary voltage data by the current/voltage converter circuit 204 in a configuration similar to FIG. 4, and restored to the original 4-bit binary voltage data $X_0$-$X_3$ by the counter circuit 204. For reference sake, it will be apparent that the current/voltage converter circuit 204A of FIG. 7 can be applied to the current/voltage converter circuit 204 in this embodiment as well.

Next, an electronic apparatus will be described as a first application example to which the data transfer circuit of the present invention is applied.

Figure 9:
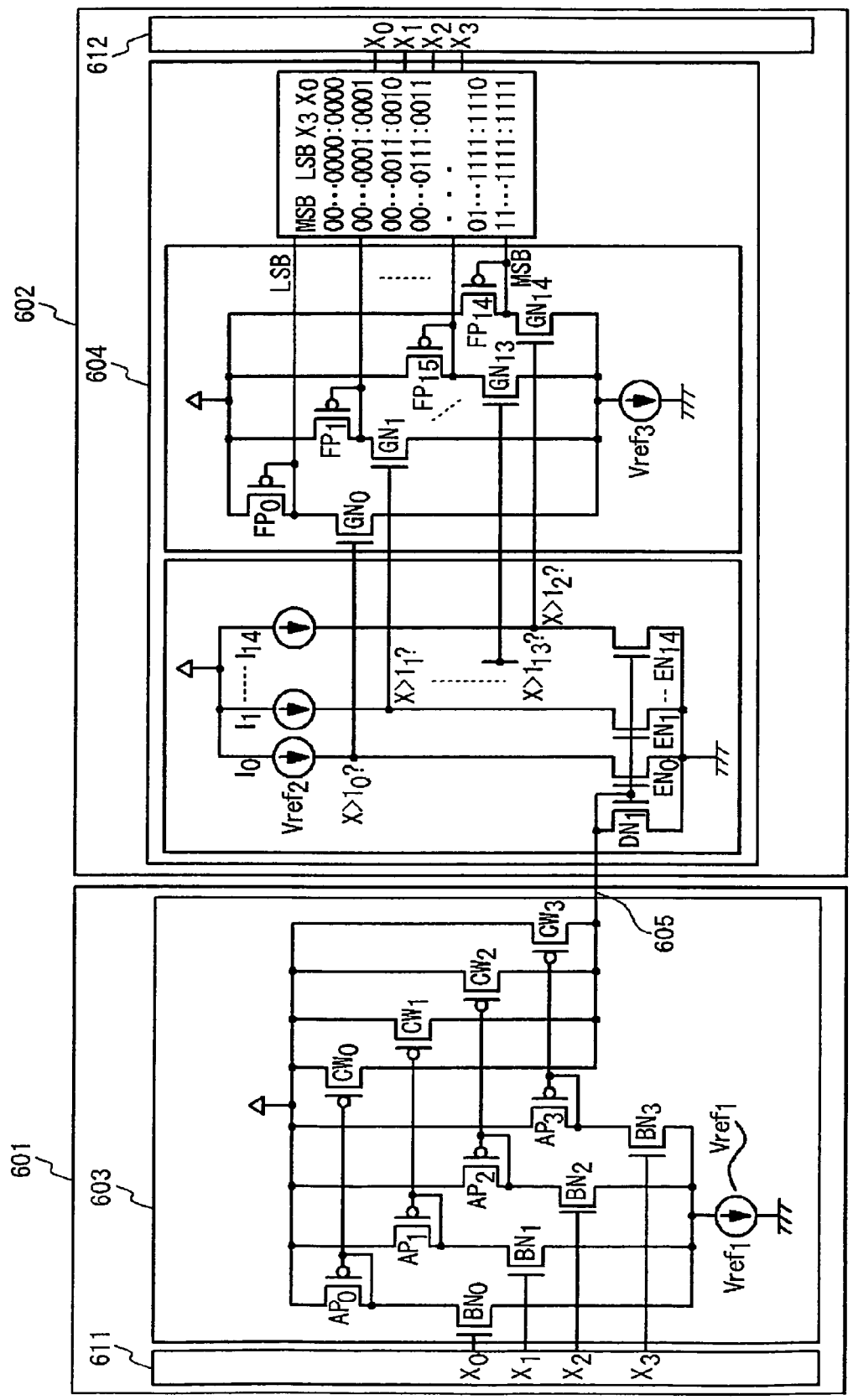
FIG. 9 is a circuit diagram showing a first application example of an electronic apparatus to which the present invention is applied.

FIG. 9 shows a first application example of an electronic apparatus to which the data transfer circuit of the present invention is applied to a transfer of multi-value data among semiconductor integrated circuits (LSI's). The electronic apparatus comprises a first LSI 601, a second LSI 602, and a single data output line 605. The first LSI 601 comprises a signal processing circuit 611, and an output circuit 603 which receives 4-bit digital data output from the signal processing circuit 611, converts it to multi-value current data which is output to the current data output line 605. The output circuit 603 is equivalent to the voltage/current converter circuit 201 in FIG. 4. The second LSI 602 comprises an input circuit 604 which receives multi-value current data supplied from the outside for conversion to 4-bit digital data, and a signal processing circuit 612 which receives the 4-bit digital data from the input circuit 604 for logical processing. The input circuit 604 is equivalent to a combination of the current comparator circuit 203, current/voltage converter circuit 204, and counter circuit 205 in FIG. 4.

FIG. 9 schematically shows the system configuration when the data output circuit of the first LSI 610 is a current output, and the input circuit of the second LSI 602 is a current input. Specifically, multi-valued current data can be bi-directionally transmitted between the first LSI 601 and second LSI 602 by further disposing the input circuit 640 in the first LSI 601 of shigel, which can transmit multi-valued current data to the input circuit 604 disposed in the second LSI 602 through the data output line 202 from the output circuit 603 disposed in the first LSI 601, and the output circuit 603 in the second LSI 602.

Next, an electronic apparatus will be described as a second application example to which the data transfer circuit of the present invention is applied.

Figure 10:
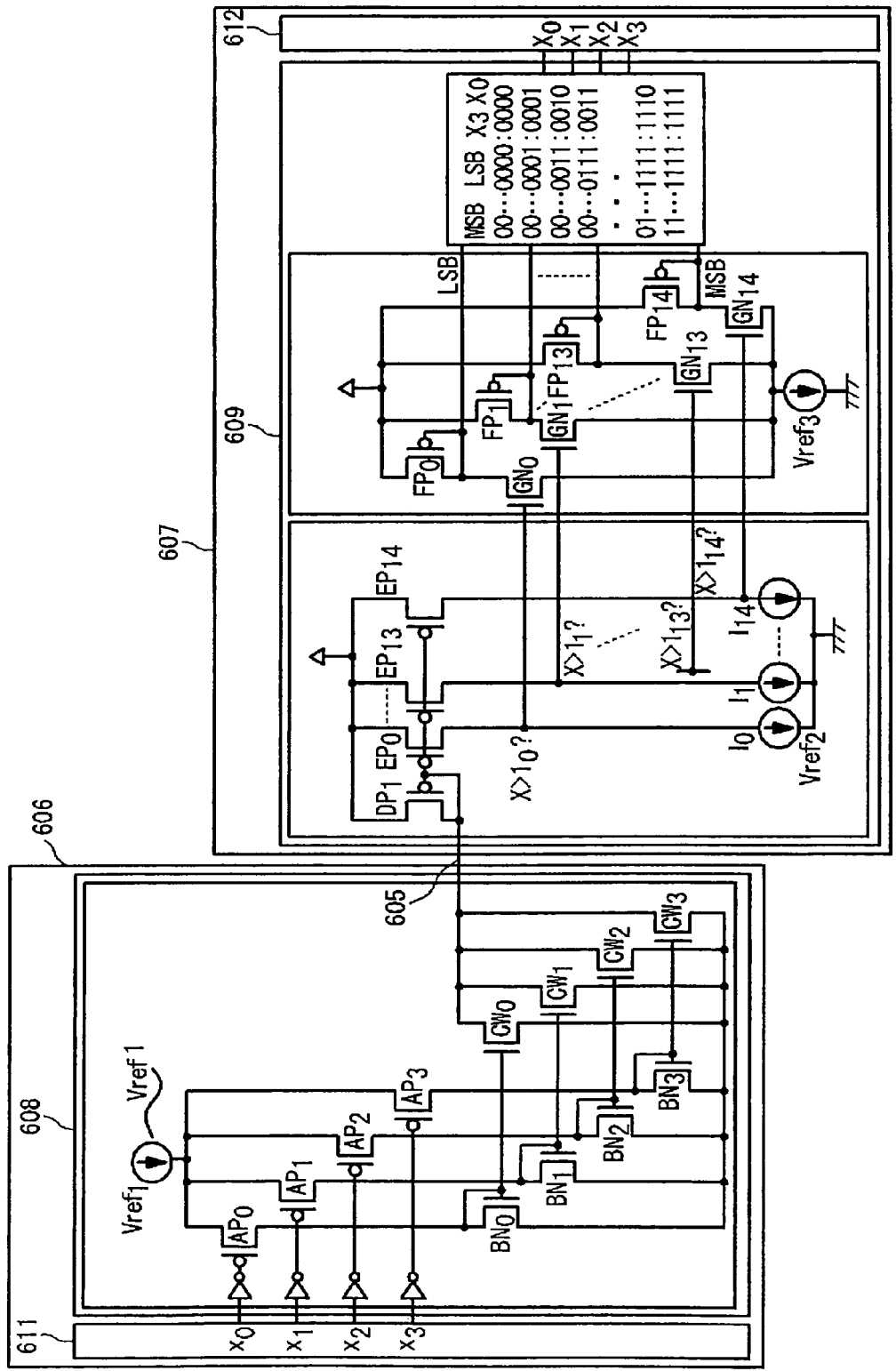
FIG. 10 is a circuit diagram showing a second application example of an electronic apparatus to which the present invention is applied.

FIG. 10 is a second application example of an electronic apparatus in which the data transfer circuit of the present invention is applied to a transfer of multi-value data between semiconductor integrated circuits (LSI's). The electronic apparatus comprises a first LSI 606, a second LSI 607, and a data output line 605. The first LSI 606 comprises a signal processing circuit 611, and an output circuit 608 which receives 4-bit digital data output from the signal processing circuit 611, and converts it to multi-value current data which is output to the current data output line 202. The output circuit 608 is equivalent to the voltage/current converter circuit 201A in FIG. 8. The second LSI 607 comprises an input circuit 609 which receives multi-value current data supplied from the outside for conversion to 4-bit digital data, and a signal processing circuit 612 which receives the 4-bit digital data from the input circuit 609 for logical processing. The input circuit 609 is equivalent to a combination of the current comparator circuit 203A, current/voltage converter circuit 204, and counter circuit 205 in FIG. 8. The current/voltage converter circuit 204A shown in FIG. 7 can also be used in place of the current/voltage converter circuit 204.

FIG. 10 is a block diagram showing part of the LSI in the second application example. Here, the system configuration is schematically shown when the data output circuit 608 of the first LSI 606 is a current input, and the input circuit 609 of the second LSI 607 is a current output. Specifically, the output circuit 608 disposed in the first LSI 606 inhales current data from the data line 202, while the input circuit 609 disposed in the second LSI 607 spats out current data to the data line 202. The second application example shown in FIG. 10 is the same as FIG. 9 in configuration except that the output circuit 603 shown in FIG. 9 is replaced with the output circuit 608, and the input circuit 604 in FIG. 9 is replaced with the input circuit 609.

In this way, multi-valued current data can be transmitted from the first LSI 606 to the second LSI 607. The multi-valued current data can be bi-directionally transmitted between the first LSI 606 and second LSI 607 by further disposing the input circuit 609 in the first LSI 606, and further disposing the output circuit 608 in the second LIS 607.

Next, an electronic apparatus will be described as a third application example to which the data transfer circuit of the present invention is applied.

Figure 11:
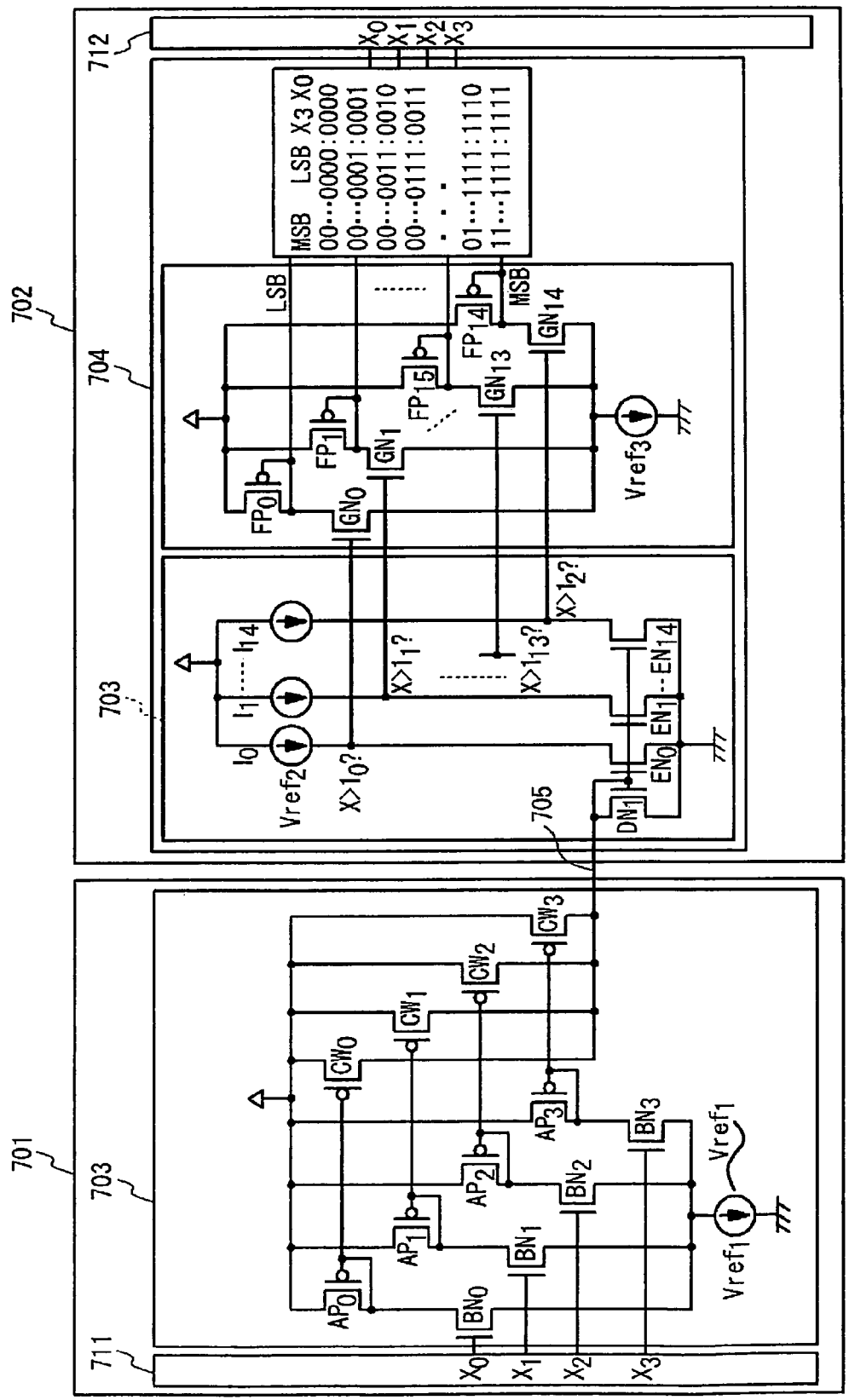
FIG. 11 is a circuit diagram showing the second application example of the electronic apparatus to which the present invention is applied.

FIG. 11 is a third application example of an electronic apparatus in which the data transfer circuit of the present invention is applied to a transfer of multi-value data between electronic devices. An electronic system comprises a first electronic device 701, a second electronic device 702, and a data output line 705. The first electronic device 701 is a television tuner, while the second electronic device is a display device. The first electronic device 701 comprises a tuner unit 711 and an output circuit 703. Multi-valued current data can be transmitted to the input circuit 704 disposed in the second electronic device 702 from the output circuit 703 through the data line 705. The second electronic device 702 comprises an input circuit 704 and a display unit 712. The input circuit 704 receives multi-valued current data supplied from the first electronic device 701 through an external data line 705, and converts it to digital data which is output to the display unit 712. In this way, the multi-value data is displayed. Here, the output circuit 703 corresponds to the voltage/current converter circuit 201 in FIG. 4; the input circuit 704 to the current comparator circuit 203, current/voltage converter circuit 204, and counter circuit 205 in FIG. 4.

Next, an electronic apparatus will be described as a fourth application example to which the data transfer circuit of the present invention is applied with reference to FIG. 12.

Figure 12:
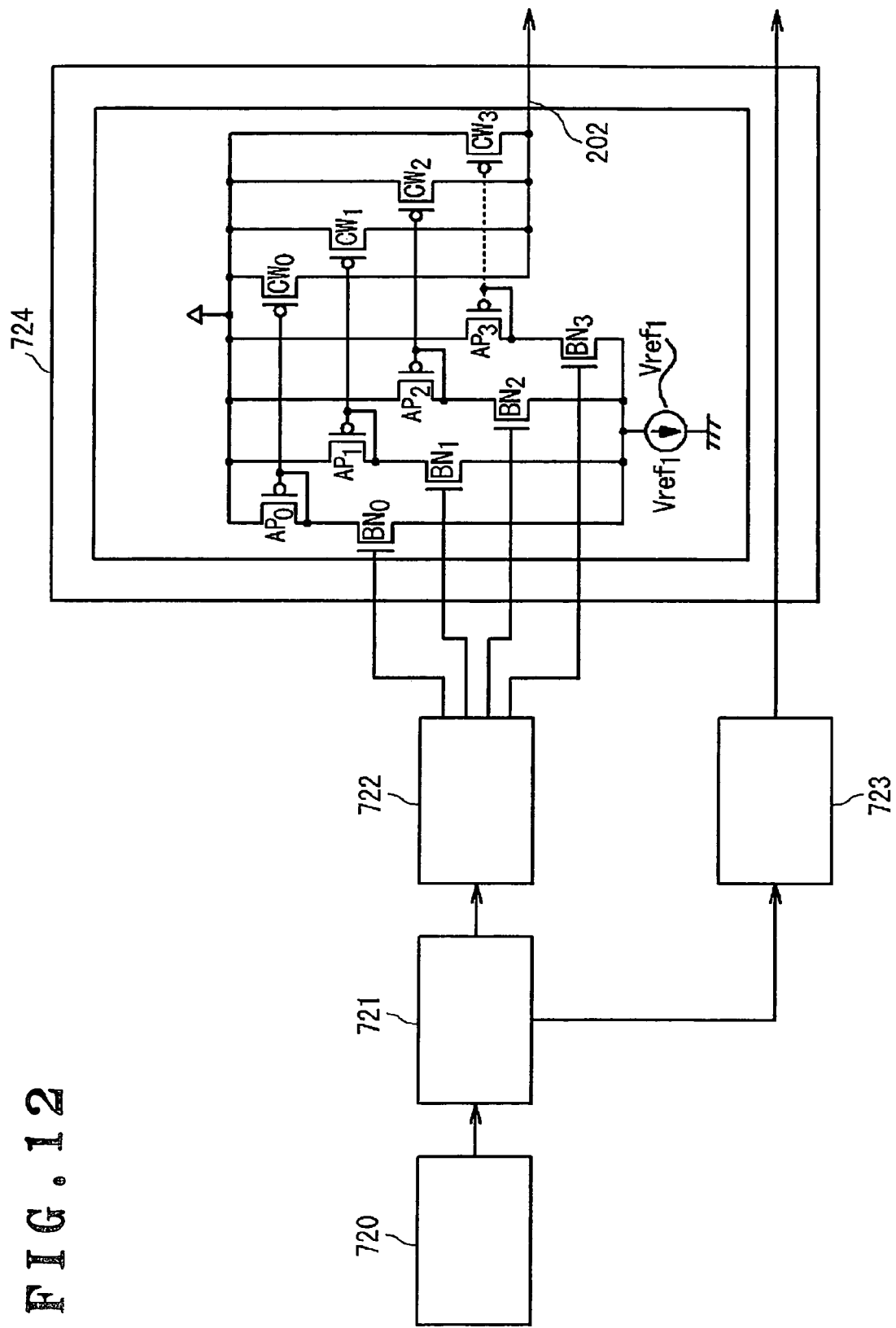
FIG. 12 is a circuit diagram showing a third application example of an electronic apparatus to which the present invention is applied.

FIG. 12 is a block diagram of a television tuner which comprises the output circuit of the present invention. When video and audio radiowaves of television broadcasting are received by a single reception antenna, it is a tuner unit 720 which selects radiowaves of a channel to be received from among a plurality of television radiowaves, performs high-frequency amplification, super-heterodyne detection, and extracts an audio intermediate frequency and a video intermediate frequency. Main functions of a conventional tuner are the functions of the tuner unit 720. However, since the television tuner shown in FIG. 12 is a tuner which performs a digital output, it further comprises a Y/C separator circuit 721, an A/D converter circuit 722, a synchronizing signal control circuit 723, and an output circuit 724. Here, the output circuit 703 corresponds to the voltage/current converter circuit 201 in FIG. 4.

A video intermediate frequency (analog video signal) output from the tuner unit 720 is decomposed into luminance signals of respective RGB colors in the Y/C separator circuit 721, and converted to digital signals of the respective RGB colors by the A/D converter circuit 722. The RGB digital signals are converted to multi-value current data by the output circuit 724, and output to the outside. On the other hand, the synchronizing signal control circuit 723 detects a synchronizing signal included in the video intermediate frequency, generates a digital synchronizing signal and a data clock signal with reference to this, and outputs them to the outside. For reference sake, the digital synchronizing signal can be converted to a multi-value current as well together with the RGB digital signals. By doing so, the number of interface lines can be reduced between the electronic devices. Further, the RGB digital signals can be converted to a single multi-value current data rather than respective RGB multi-value current data. In this way, signal lines can be reduced from three to one.

Figure 13:
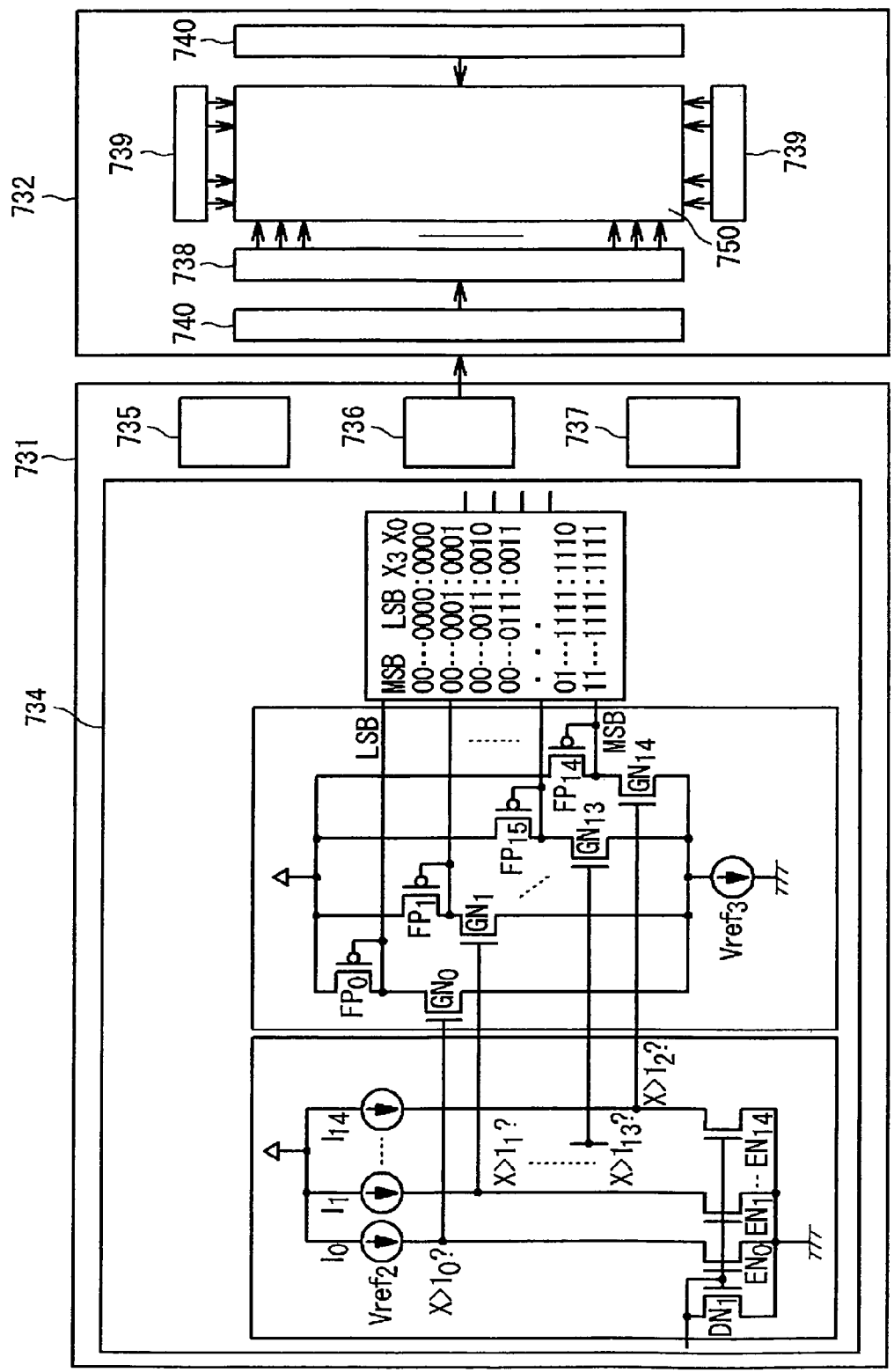
FIG. 13 is a circuit diagram showing a tuner as a fourth application example of an electronic apparatus to which the present invention is applied.

FIG. 13 is a block diagram of a display device as a fifth application example to which the input circuit of the present invention is applied. Here, a description will be made giving a plasma display as an example. The plasma display device comprises a digital signal processing/control circuit 731, and a panel unit 732. The digital signal processing/control circuit 731 comprises an input circuit 734, a frame memory 735, a memory control circuit 736, and a driver control circuit 737. The input circuit 734 receives a data clock signal and respective RGB multi-value current data. The multi-value current data is assumed to include a vertical synchronizing signal and a horizontal synchronizing signal. The input circuit 734 converts the multi-value current data from current to voltage in synchronism with the data clock signal. The input circuit 734 corresponds to the current comparator circuit 203, current/voltage converter circuit 204, and counter circuit 205. A method of converting the multi-value current data from current to voltage is in conformity to the method described in this specification. The vertical synchronizing signal and horizontal synchronizing signal are assigned to any of converted 3×m-bit binary voltage data of respective RGB, which consists of m bits. Therefore, the input circuit 729 reproduces (m−1)-bit digital data signals of respective RGB, the vertical synchronization signal, and the horizontal signal from the RGB multi-value current data. The digital data signal is converted to display data in a format displayed on the panel unit 732 using the frame memory 735 and memory control circuit 736 in accordance with the vertical synchronizing signal and horizontal synchronizing signal, and transferred to the panel unit 32. The driver control circuit 737 controls the panel unit 732 corresponding to the display data transferred to the panel unit 32. When the pixel arrangement of multi-value current data supplied to the input circuit 734 is different from the pixel arrangement of the panel unit 732, an image format conversion may be performed by the frame memory 735 and memory control circuit 736.

The panel unit 732 comprises a PDP panel 750, a scan driver 738 for driving a scan electrode, a data driver 739 for driving a data electrode, and a high-voltage pulse circuit 740 for supplying pulse voltages to the PDP panel 750 and scan driver 738. The PDP panel 750 is organized to have pixels arranged in 1365×768 matrix. In the PDP panel 750, the scan driver 738 controls the scan electrode, and the data driver 739 controls the data electrode, thereby controlling predetermined pixels among these pixels to turn on or off to make a desired display.

In this display device of the fifth application example, an electronic device which serves to source display data can be connected through a data clock signal and multi-value current data of respective RGB. However, when there are a plurality of display modes, a control signal is required for controlling the display modes. It goes without saying that this control signal can also be transmitted through the multi-value current data.

Figure 14:
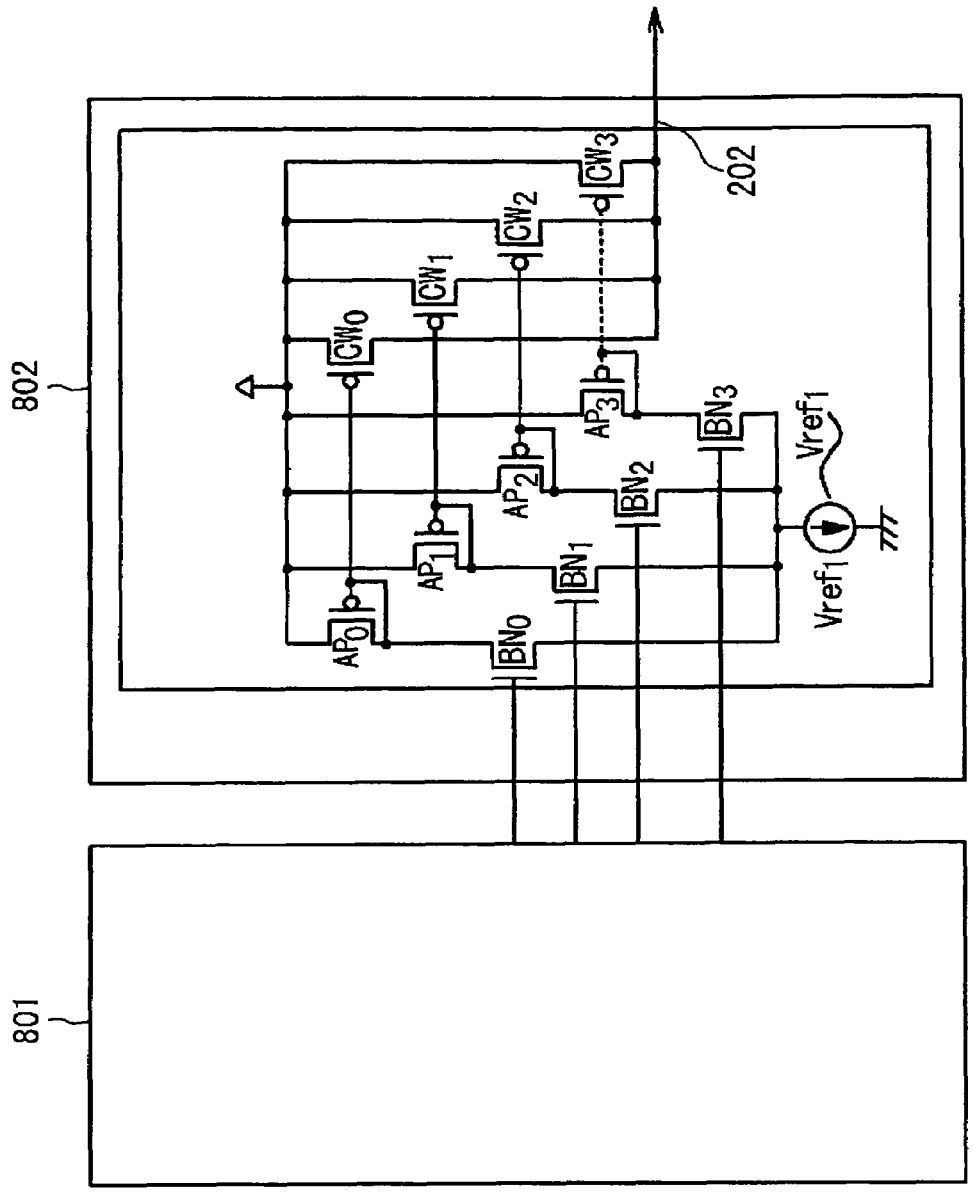
FIG. 14 is a circuit diagram showing a personal computer as a fifth application example of an electronic apparatus to which the present invention is applied.

For reference sake, the data clock is omitted in FIG. 14 for simplicity. While the data clock is required in other embodiments as well, it is omitted for simplicity.

FIG. 14 is a block diagram showing a personal computer as a sixth application example to which the output circuit of the present invention is applied. A processing unit 801 is a circuit unit which is provided with functions of a conventional personal computer. 3×k bits (k is an integer equal to or larger than two) of RGB digital data for display, one bit of a vertical synchronizing signal, and one bit of data clock are supplied from the processing unit 801 to an output circuit 802. The output circuit 702 adds one bit of the vertical synchronizing signal to k bits of R digital data to generate k+1 bits of binary voltage signal which are converted to R multi-value current data; adds one bit of the horizontal synchronizing signal to k bits of G digital data to generate k+1 bits of binary voltage data which are converted to G multi-value current data; and adds one bit of a dummy signal to k bits of B digital data to generate k+1 bits of binary voltage data which are converted to B multi-value current data. A method of converting k+1 bits of digital data to multi-value current data conforms to the voltage/current converting method in the output circuit of the present invention. The respective RGB multi-value current data and one bit of clock data are output to the outside of the personal computer.

The output circuit 802 corresponds to the voltage/current converter circuit 201 in FIG. 4. However, the input is described as a 4-bit digital input for simplicity in FIG. 14, but a bit organization of four bits or more is normal in actuality. Also, while only one system of voltage/current converter circuit is described for simplicity, one system is required for each of RGB.

In this way, by outputting display data of a personal computer as multi-value current data of respective RGB and one bit of data clock instead of a conventional analog RGB signal, the data can be transferred in the same signal form as the television tuner of the fourth embodiment. Specifically, the analog RGB signal conventionally used by a personal computer as an interface for a display device, and a video intermediate frequency (analog video signal) conventionally used in video devices including a television can be integrated into respective RGB multi-value current data and one bit of data clock.

Next, a color PDP module will be described as a seventh application example to which the data transfer circuit of the present invention is applied. An example of using multi-value current data for an interface with a display device such as a plasma display will be described with reference to FIG. 15. Giving, as an example, a representative data driver operation voltage of a color plasma display (hereinafter abbreviated as "color PDP") module, an input signal is 5 V, and an output signal is 70 V.

Figure 16:
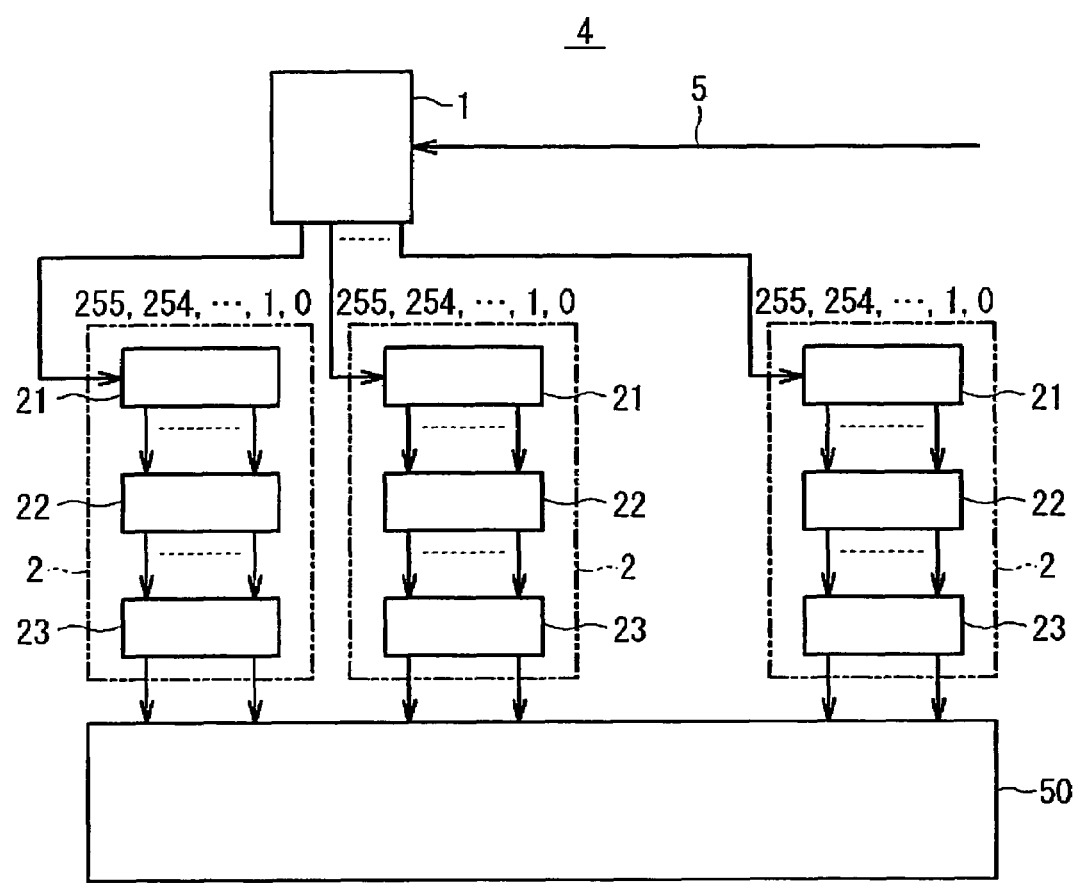
FIG. 16 is a circuit diagram showing the circuit configuration of a wide XGA color PDP module to which a conventional data driver is applied.

FIG. 16 shows the configuration of a conventional wide XGA (W-XGA; 1365×768 pixels) color PDP module 4. As shown in FIG. 16, in the conventional color PDP module 4. A very large scale integrated circuit on a digital signal/control circuit performs video signal processing operations using a low voltage signal of 3.3 V or lower, where the signal is boosted to a 5.0-V signal at an output stage of a digital signal processing board 1 and transmitted to data driver 2. The data driver simultaneously outputs data for one line (1365 pixels) to the plasma panel. Thus, the WXGA panel requires 16 (1365×3 [one pixel each for RGB]/256=<16) 256-bit output data drivers 2.

Each data driver 2 has four vide0 input signals (Data), one clock input signal (CLK), and one latch enable input signal (LE), i.e., a total of six signal lines. Thus, the number of signal lines output from the digital signal processing board 1 to the data drivers 2 amounts to 96 (=6×16). Here, the data driver 2 comprises a register, a level converter circuit for converting (amplifying) a voltage, and a high-voltage output buffer. This data driver 2 is supplied with a video data signal which is transferred from the digital signal processing board 1 in synchronism with the transfer clock signal. The video data signal is preserved in the register of the data driver 2, and sent to the level converter circuit in synchronism with the input of the latch enable signal. All signals supplied to the data driver 2 have an amplitude of 5.0 V, and in the data driver 2, a portion up to the input to the level converter circuit (including the register) is a low-voltage operation section 21. In the low-voltage operation section 21, signals are processed at the amplitude of 5.0 V. On the other hand, the level converter circuit is the voltage converter unit 22 for amplifying a signal having the amplitude of 5.0 V to the amplitude of 70 V. Also, in the data driver 2, a portion subsequent to the level converter circuit (including a high-voltage output buffer) is a high-voltage operation section. A high-voltage signal output from the level converter circuit is output to the PDP panel through the high-voltage output buffer.

Figure 15:
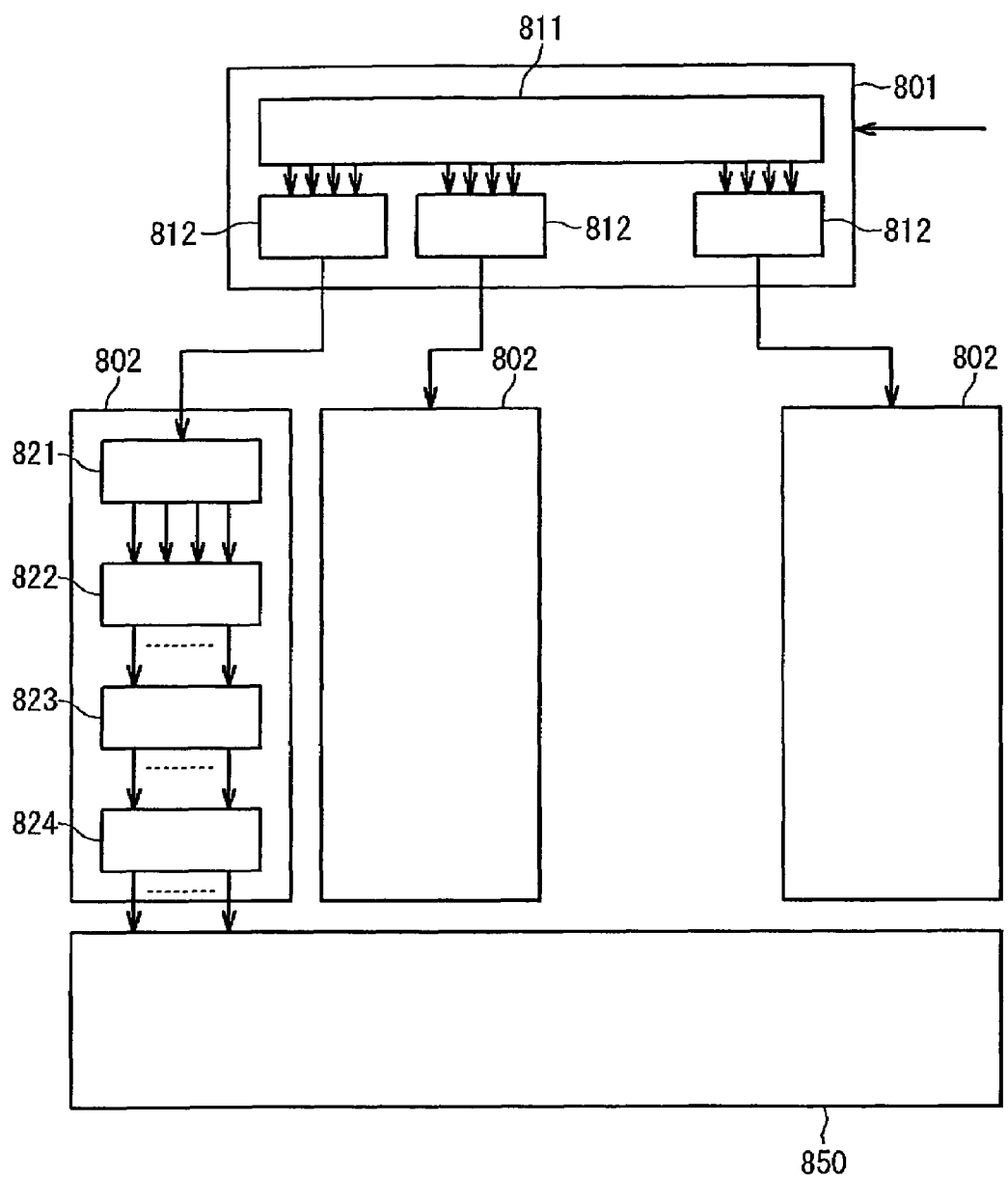
FIG. 15 is a circuit diagram showing the circuit configuration of a color PDP module to which a multi-value current data transfer system of the present invention is applied.

FIG. 15 shows an example which employs the multi-value current data transfer system of the present invention to the prior art of FIG. 16. As shown in FIG. 15, a data transfer circuit 811 on a digital signal/control circuit comprises a memory circuit 811 and an output circuit 812. The memory circuit performs processing for dividing a signal supplied as digital binary serial data for 16 of 256-bit output data drivers 802, and divides the signal into 4-bits ×16 blocks of data. Up to here, the operation is the same as that in the example of FIG. 7. The 4-bit data are input to 16 output circuits 812, respectively. The output circuit 812, which performs the voltage/current conversion of the present invention, converts the 4-bit binary voltage input to 16-value multi-value current data. Specifically, four video output signals are conventionally input to output data drivers, respectively, whereas in the present invention, a single 16-value multi-value current data is only input to the output data driver. Other signals are required as is the case with FIG. 16. Therefore, it has a total of three signal lines, including one for a clock input signal (CLK), and one for a latch enable input signal (LE). Therefore, the number of signal lines output from the data transfer circuit 801 to the data drivers 802 is 48 (=3×16), which is one-half as compared with the conventional system in FIG. 16.

The data driver 802 in the seventh application example differs from the data driver 2 in FIG. 15 in that an input circuit 821 is provided in the input stage. The input circuit 821 is an input circuit which comprises the current comparator circuit, current/voltage converter circuit, and counter circuit of the present invention, for reproducing four bits of binary voltage from 16-value multi-value current data. The operation of the data driver 602 after reproducing binary data is similar to the conventional example in FIG. 16. Specifically, the data driver 802 comprises a register 822, a level converter 823 for converting (amplifying) a voltage, and a high-voltage output buffer 824. A reproduced video data signal in the form of binary voltage is preserved in the register 822, sent to the level converter circuit 823 in synchronism with the input of the latch enable signal, and output to the PDP panel 850 through the high-voltage output buffer 924.

As described above, the data transfer method and circuit of the present invention are less susceptible to the influence of noise on the transmission side. Also, the data transfer method and circuit of the present invention require a smaller amount of hardware than the conventional circuit for converting from binary voltage data to multi-value current data. Further, the data transfer method and circuit of the present invention restore original binary voltage data from multi-value current data on the reception side faster than the conventional circuit.

The invention claimed is:

1. A data transfer method for a digital image processing apparatus, comprising the steps of:
   converting first binary voltage data of n-bit (n is an integer equal to or larger than two) to multi-value current data of $2^n$ values;
   transferring the multi-value current data through a single data line;
   converting the multi-value current data on the data line to binary current data of $(2^n-1)$ bits;
   converting the binary current data of the $(2^n-1)$ bits to second binary voltage data of $(2^n-1)$ bits; and
   restoring the first binary voltage data of the n bits from the second binary voltage data of the $(2^n-1)$ bits.

2. A data transfer circuit for a digital image processing apparatus, comprising:
   a voltage/current converter circuit for converting first binary voltage data of n-bit (n is an integer equal to or larger than two) to multi-value current data of $2^n$ values;
   a single data transfer line for transferring the multi-value current data;
   a current comparator circuit for converting the multi-value current data on the data line to binary current data of $(2^n-1)$ bits;
   a current/voltage converter circuit for converting the binary current data of the $(2^n-1)$ bits to second binary voltage data of $(2^n-1)$ bits; and
   a counter circuit for restoring the first binary voltage data of the n bits from the second binary voltage data of the $(2^n-1)$ bits.

3. A data transfer circuit according to claim 2, wherein:
   said voltage/current converter circuit generates a current proportional to a value $2^i$ (i is an integer equal to or larger than zero and equal to or smaller than n-1) corresponding to each bit of the n bits, and multiplexes the generated currents to output the multi-value current data of the 2n bits having a current value proportional to the first binary voltage data of the n bits on the data transfer line.

4. A data transfer circuit according to claim 2 or 3, wherein:
   said current comparator circuit expands the multi-value current data to $(2^n-1)$ bits, and outputs the binary current data of the $(2^n-1)$ bits, the logical values of which are determined based on whether or not a current value of the multi-value current data is larger than a corresponding threshold current at each of the $(2^n-1)$ bits.

5. A data transfer circuit according to claim 2 or 3 wherein:
   said current/voltage converter circuit converts the binary current data of the $(2^n-1)$ bits to the second binary voltage data of the $(2^n-1)$ bits in units of bits.

6. A data transfer circuit according to claims 2 or 3, wherein:
   said counter circuit comprises a logic circuit which receives the second binary voltage data of the $(2^n-1)$ bits, and restores the first binary voltage data based on positions of bits which have logical "1".

7. A data transfer circuit according to claim 3, wherein:
   said voltage/current converter circuit comprises a group of first circuits arranged in parallel in correspondence to the n bits, and
   each of said first circuits generates a current proportional to the value $2^i$ (i is an integer equal to or larger than zero and equal to or smaller than n-1) corresponding to a corresponding bit of the n bits.

8. A data transfer circuit according to claim 7, wherein:
   each of said first circuits comprises:
   a first transistor having a source terminal connected to a power supply terminal or a ground terminal, and a gate terminal and a drain terminal connected to each other;
   a second transistor applied at a gate with first binary voltage data of the corresponding bit of the n bits from the outside, and having a drain terminal connected to the drain terminal of the first transistor; and
   a third transistor having a source terminal connected to the power supply terminal or the ground terminal, and a gate terminal connected to the gate terminal of said first transistor,
   said voltage/current converter circuit further comprises a first constant current source connected between the source terminal of said second transistor in each of said first circuits and the ground terminal or the power supply terminal, and
   said third transistor in each of said first circuits has a drain terminal connected to the data transfer line in common.

9. A data transfer circuit according to claim 8, wherein:
   said third transistor in each of said first circuits has the gate terminal, the size of which is set to have an output current value proportional to the value $2^i$ in accordance with the first binary voltage data of n bits supplied from the outside.

10. A data transfer circuit according to claim 4, wherein:

said current comparator circuit comprises a group of second circuits arranged in parallel in correspondence to the $(2^n-1)$ bits, and each of said second circuits sets a logical value of a corresponding bit to "1" when a current value of the multi-value current data is larger than a corresponding threshold current.

11. A data transfer circuit according to claim 10, wherein:

said current comparator circuit comprises a fourth transistor which receives the multi-value current data at a drain, and has a gate terminal connected to the drain terminal, and a source terminal connected to a ground terminal or a power supply terminal, and said group of second circuits, and each of said second circuits comprises:

a fifth transistor having a gate terminal connected to the gate terminal of said fourth transistor, a source terminal connected to a common ground terminal or a common power supply terminal; and a second constant current source connected between the drain terminal of said fifth transistor and the power supply terminal or the ground terminal for applying the threshold current, and said current comparator circuit outputs the second binary current data of the $(2^n-1)$ bits, the logical value of which is set to "1" from LSB to a bit corresponding to the threshold current.

12. A data transfer circuit according to claim 11, wherein:

said second constant current source applies different threshold currents of the $(2^n-1)$ bits in predetermined step units, and said current comparator circuit outputs binary current data of $(2^n-1)$ bits which has a bit corresponding to the largest threshold current at MBS, and a bit corresponding to the smallest threshold current at LSB.

13. A data transfer circuit according to claim 5, wherein:

said current/voltage converter circuit comprises a group of third circuits arranged in parallel in correspondence to the $(2^n-1)$ bits of the binary current data, respectively, and each of the third circuits converts a corresponding bit of the binary current data of the $(2^n-1)$ bits to a corresponding bit of the second binary voltage data of $(2^n-1)$ bits.

14. A data transfer circuit according to claim 13, wherein:

said current/voltage converter circuit comprises a third constant current source and said group of third circuits, and each of said third circuits comprises:

a sixth transistor having a source terminal connected to a common power supply terminal or a common ground terminal, and a gate terminal connected to a drain terminal; and a seventh transistor having a gate terminal for receiving the binary current data of a corresponding bit of the $(2^n-1)$ bits, a source terminal connected to said third constant current source, and a drain terminal connected to the drain terminal of said sixth transistor.

15. A data transfer circuit according to claim 6, wherein:

said counter circuit comprises a logic circuit for restoring the first binary voltage data of the n bits which have all bits at logical "0" when all the bits of the second binary voltage data of the $(2^n-1)$ bits are logical "0," and restoring the first binary voltage data of the n bits corresponding to a binary number of the number of bits of logical "1" from LSB of the second binary voltage data of the $(2^n-1)$ bits.

16. A data transfer circuit according to claim 15, wherein:

said counter circuit comprises a bit determination circuit for three least significant bits, and said bit determination circuit comprises:

a first 3-bit input AND circuit for outputting logical "1" when the three least significant bits are logical "1";

a second 3-bit input AND circuit for outputting logical "1" when only a third bit is logical "1"; and an OR circuit for calculating a logical OR of the output of said first 3-bit input AND circuit and the output of said second 3-bit input AND circuit.

17. A data transfer circuit according to claim 4, wherein:

said current/voltage converter circuit converts the binary current data of the $(2^n-1)$ bits to the second binary voltage data of the $(2^n-1)$ bits in units of bits.

18. A data transfer circuit according to claim 4, wherein:

said counter circuit comprises a logic circuit which receives the second binary voltage data of the $(2^n-1)$ bits, and restores the first binary voltage data based on positions of bits which have logical "1".

19. A data transfer circuit according to claim 5, wherein:

said counter circuit comprises a logic circuit which receives the second binary voltage data of the $(2^n-1)$ bits, and restores the first binary voltage data based on positions of bits which have logical "1".

* * * * *